US010775502B2

(12) United States Patent
Ichikawa et al.

(10) Patent No.: US 10,775,502 B2
(45) Date of Patent: Sep. 15, 2020

(54) DISTANCE-MEASURING APPARATUS, MOBILE OBJECT, ROBOT, THREE-DIMENSIONAL MEASURING DEVICE, SURVEILLANCE CAMERA, AND DISTANCE-MEASURING METHOD

(71) Applicant: Ricoh Company, Ltd., Tokyo (JP)

(72) Inventors: Yoichi Ichikawa, Kanagawa (JP); Hiroaki Tanaka, Tokyo (JP); Shu Takahashi, Kanagawa (JP); Masahiro Itoh, Kanagawa (JP); Yasuhiro Nihei, Kanagawa (JP); Takeshi Ogawa, Kanagawa (JP); Toshishige Fujii, Kanagawa (JP)

(73) Assignee: RICOH COMPANY, LTD, Tokyo (JP)

( * ) Notice: Subject to any disclaimer, the term of this patent is extended or adjusted under 35 U.S.C. 154(b) by 435 days.

(21) Appl. No.: 15/808,674

(22) Filed: Nov. 9, 2017

(65) Prior Publication Data

US 2018/0128919 A1    May 10, 2018

(30) Foreign Application Priority Data

Nov. 10, 2016   (JP) ................................. 2016-219373

(51) Int. Cl.
*G01S 17/10*    (2020.01)
*G01S 17/89*    (2020.01)
(Continued)

(52) U.S. Cl.
CPC ............ *G01S 17/10* (2013.01); *G01S 7/4914* (2013.01); *G01S 17/32* (2013.01); *G01S 17/89* (2013.01)

(58) Field of Classification Search
CPC .......... G01S 17/10; G01S 17/32; G01S 17/89; G01S 7/4914
(Continued)

(56) References Cited

U.S. PATENT DOCUMENTS

| 5,428,439 A * | 6/1995 | Parker ....................... B60T 7/22 356/5.01 |
| 7,994,465 B1 * | 8/2011 | Bamji ................... G01S 7/4816 250/214 R |

(Continued)

FOREIGN PATENT DOCUMENTS

| EP | 2005-156192 | 6/2005 |
| JP | 2-174410 | 7/1990 |

(Continued)

*Primary Examiner* — Daniel L Murphy
(74) *Attorney, Agent, or Firm* — Xsensus LLP

(57) ABSTRACT

A distance-measuring apparatus, a mobile object, a robot, a three-dimensional measuring device, a surveillance camera, and a distance-measuring method. The distance-measuring apparatus, a mobile object includes a light source to emit light, an imaging element to receive and photoelectrically convert the light into a plurality of electrical signals, and to obtain the electrical signals upon being sorted into a plurality of phase signals, and a computing unit to calculate distance to the object based on the phase signals. In the distance-measuring apparatus, a period of time during which the imaging element obtains the phase signals is different from a light emitting period of the light source in length. The distance-measuring method includes determining whether or not aliasing is present based on a light emitting period of the light source, a period of time during which the plurality of phase signals are obtained, and a result of the calculating.

18 Claims, 28 Drawing Sheets

(51) Int. Cl.
   *G01S 17/32* (2020.01)
   *G01S 7/4914* (2020.01)

(58) Field of Classification Search
   USPC .......................................................... 356/5.01
   See application file for complete search history.

(56) References Cited

U.S. PATENT DOCUMENTS

| | | | |
|---|---|---|---|
| 9,945,947 B2* | 4/2018 | Shin | G01S 17/89 |
| 2003/0135122 A1* | 7/2003 | Bambot | A61B 5/0071 |
| | | | 600/476 |
| 2007/0019887 A1* | 1/2007 | Nestares | G06T 3/4053 |
| | | | 382/299 |
| 2015/0002638 A1 | 1/2015 | Suzuki et al. | |
| 2015/0092994 A1 | 4/2015 | Masuda et al. | |
| 2015/0243017 A1 | 8/2015 | Fujimoto et al. | |
| 2016/0370460 A1 | 12/2016 | Takahashi et al. | |
| 2017/0199271 A1 | 7/2017 | Nihei et al. | |
| 2017/0212224 A1 | 7/2017 | Itoh et al. | |
| 2017/0261611 A1 | 9/2017 | Takahashi et al. | |
| 2018/0227475 A1* | 8/2018 | Kishimoto | G01S 17/10 |

FOREIGN PATENT DOCUMENTS

| | | |
|---|---|---|
| JP | 8-211145 | 8/1996 |
| JP | 10-288803 | 10/1998 |
| JP | 11-094542 | 4/1999 |
| JP | 2000-137434 | 5/2000 |
| JP | 2001-148868 | 5/2001 |
| JP | 2004-538491 | 12/2004 |
| JP | 2005-235893 | 9/2005 |
| JP | 2006-337286 | 12/2006 |
| JP | 2006-337309 | 12/2006 |
| JP | 2007-232687 | 9/2007 |
| JP | 2007-248227 | 9/2007 |
| JP | 2008-116308 | 5/2008 |
| JP | 2008-116309 | 5/2008 |
| JP | 2009-079987 | 4/2009 |
| JP | 2009-103627 | 5/2009 |
| JP | 2010-025906 | 2/2010 |
| JP | 2010-096730 | 4/2010 |
| JP | 2010-103810 | 5/2010 |
| JP | 2010-190675 | 9/2010 |
| JP | 2010-286488 | 12/2010 |
| JP | 2011-013138 | 1/2011 |
| JP | 2011-064498 | 3/2011 |
| JP | 2012-029130 | 2/2012 |
| JP | 2012-247226 | 12/2012 |
| JP | 2013-134173 | 7/2013 |
| JP | 2013-538342 | 10/2013 |
| JP | 2015-501927 | 1/2015 |
| JP | 2015-028469 | 2/2015 |
| JP | 2015-068748 | 4/2015 |
| JP | 2015-069254 | 4/2015 |
| JP | 2015-070619 | 4/2015 |
| JP | 2015-108629 | 6/2015 |
| JP | 2015-172934 | 10/2015 |
| JP | 2016-008875 | 1/2016 |
| JP | 2016-015977 | 2/2016 |
| JP | 2016-017799 | 2/2016 |
| JP | 2016-080545 | 5/2016 |
| JP | 2017-009339 | 1/2017 |
| JP | 2017-015611 | 1/2017 |
| JP | 2017-116314 | 6/2017 |
| JP | 2017-125829 | 7/2017 |
| JP | 2017-133853 | 8/2017 |
| JP | 2017-156306 | 9/2017 |
| WO | WO2003/016944 A2 | 2/2003 |
| WO | WO2007/026779 A1 | 3/2007 |
| WO | WO2010/021090 A1 | 2/2010 |
| WO | WO2012/009170 A1 | 1/2012 |
| WO | WO2012/012607 A2 | 1/2012 |
| WO | WO2012/137434 A1 | 10/2012 |
| WO | WO2013/104717 A1 | 7/2013 |

* cited by examiner

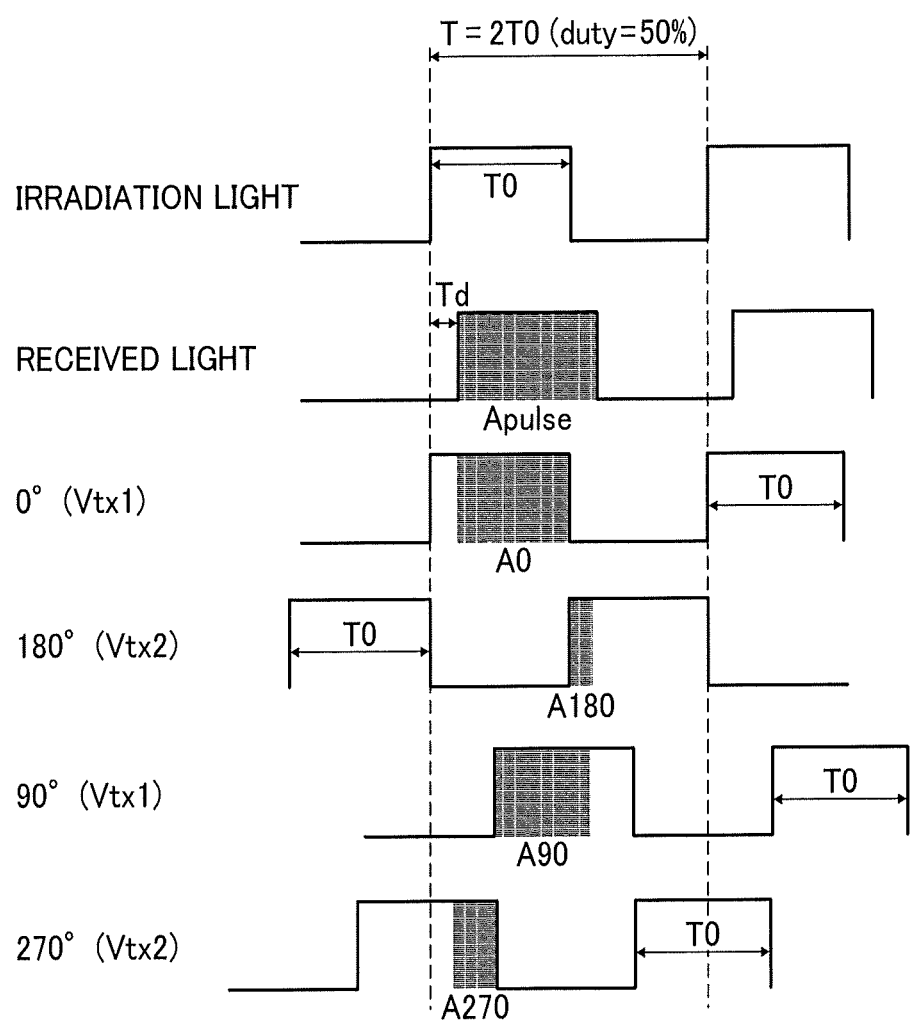

DISTANCE-MEASURING APPARATUS, MOBILE OBJECT, ROBOT, THREE-DIMENSIONAL MEASURING DEVICE, SURVEILLANCE CAMERA, AND DISTANCE-MEASURING METHOD

CROSS-REFERENCE TO RELATED APPLICATION

This patent application is based on and claims priority pursuant to 35 U.S.C. § 119(a) to Japanese Patent Application No. 2016-219373, filed on Nov. 10, 2016, in the Japan Patent Office, the entire disclosure of which is hereby incorporated by reference herein.

BACKGROUND

Technical Field

Embodiments of the present disclosure relate to a distance-measuring apparatus, a mobile object, a robot, a three-dimensional measuring device, a surveillance camera, and a distance-measuring method.

Background Art

Currently, distance-measuring equipment that measures the distance to an object using time-of-flight (TOF) are actively developed.

For example, distance-measuring equipment using so-called time-of-flight (TOF) computation are known in the art in which the distance to an object is calculated based on the time it takes for the light to be emitted, reflected by the object, and return.

SUMMARY

Embodiments of the present disclosure described herein provide a distance-measuring apparatus, a mobile object, a robot, a three-dimensional measuring device, a surveillance camera, and a distance-measuring method. The distance-measuring apparatus, a mobile object includes a light source to emit light, an imaging element to receive and photoelectrically convert the light, which is emitted from the light source and then reflected by an object, into a plurality of electrical signals, and to obtain the electrical signals upon being sorted into a plurality of phase signals, and a computing unit to calculate distance to the object based on the phase signals. In the distance-measuring apparatus, a period of time during which the imaging element obtains the phase signals is different from a light emitting period of the light source in length. The distance-measuring method includes controlling a light source to emit light, receiving and photoelectrically converting the light, which is emitted from the light source and then reflected by an object, into a plurality of electrical signals, to obtain the electrical signals upon being sorted into a plurality of phase signals, calculating distance to the object based on the phase signals, determining whether or not aliasing is present based on a light emitting period of the light source, a period of time during which the phase signals are obtained, and a result of the calculating, and adjusting the period of time during which the phase signals are obtained, with reference to the light emitting period, according to a result of the determining.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

FIG. 14 is a timing chart illustrating the relation among irradiation light, received light, phase signals, and acquisition time control signals when a known four-phase TOF sensor has received light.

Figure 1:
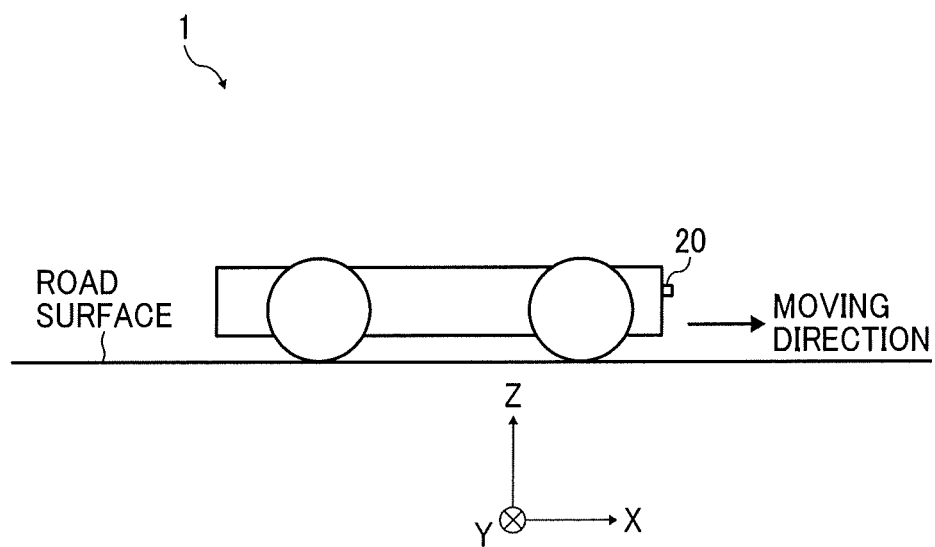
FIG. 1 is a diagram illustrating an external appearance of a vehicle for which a distance sensor is provided, according to an embodiment of the present disclosure.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

As one three-dimensional sensor (distance sensor) that measures and obtained three-dimensional data, a TOF sensor is known that adopts a time-of-flight (TOF) method and calculates the distance to an object to be measured by projecting modulated irradiation light and measuring the length of time of flight it takes for the projected irradiation light to be reflected by the object and return to the sensor. The TOF sensors have theoretical superiority in speediness or responsiveness over other various kinds of three-dimensional sensing methods, and its application to various kinds of usage is being developed. For example, application to gesture recognition or position control of a mobile object such as a robot and a car is expected.

The TOF method includes a direct TOF method and an indirect TOF method, and as known in the art, the indirect TOF method is suitable for measuring short distances.

As known in the art, a TOF sensor includes a light source that emits reference light and an imaging element. In the measurement, firstly, the light source emits reference light, and the imaging element converts the light reflected by an object into electrical signals. Then, the obtained electrical signals are sorted into a plurality of phase signals, and the distance to the object is obtained by the computation (TOF computation) using the multiple phase signals. Some known TOF sensors obtain the distance to an object typically by performing multi-phase shift. For example, a four-phase TOF sensor obtains such distance using four phase signals (amounts of phase shift: 0°, 90°, 180°, 270°) for the modulation frequency of reference light.

There is a limitation on the distance measurable range of a TOF sensor. Such a distance measurable range is determined by the modulation frequency of reference light. For example, a four-phase TOF sensor cannot measure a distance where time of flight of reference light is equal to or longer than twice the pulse width of the reference light, and due to a phenomenon called aliasing, the output distance becomes cyclic with reference to the measurable distance. Accordingly, as the pulse width of the reference light is longer and the modulation frequency is lower, the maximum measurable distance of the TOF sensor becomes even longer and the distance measurable range becomes even wider.

By contrast, the accuracy of distance measurement of a TOF sensor is determined by the modulation frequency of reference light, and as the modulation frequency is higher and the pulse width is shorter, the accuracy improves. In many applications expected of a TOF sensor, both a wide distance measurable range and distance measurement with a high degree of accuracy are demanded, and in such a configuration, measures need to be taken to avoid aliasing effects (anti-aliasing technology).

In most of the known anti-aliasing technologies, phase signals are obtained using the reference light of a plurality of modulation frequencies (pulse widths), and the obtained phase signals are used for TOF computation. In such a configuration, first of all, the light source unit and the light receivers need to be driven at a plurality of modulation frequencies, and thus one of or both the mechanism and the control system of a TOF sensor need to be modified. Further, the number of phase signals that need to be obtained from one frame, from which a distance value is to be output, also increases, and thus the frame configuration may become complicated.

Note that a distance computation method is known in the art in which the reference light of a plurality of different modulation frequencies is used in one-time capturing by a distance image sensor. In such a distance computation method, aliasing is avoided using the frequency and difference frequency of the reference light and the intermediate frequency.

However, in such a configuration, the reference light of a plurality of different modulation frequencies needs to be used for the light source, and thus the light source unit, the light receiver, and the frame configuration tend to be complicated. In this respect, there is room for improvement in such a configuration.

In other words, in the known distance-measuring apparatuses or distance-measuring method, there is room for improvement in broadening the distance measurable range while preventing complication in configuration or control.

Embodiments of the present disclosure are described below with reference to the accompanying drawings. As the indirect TOF method is adopted in the present disclosure, unless otherwise specified, the TOF method refers to the indirect TOF method, and a TOF sensor refers to a distance sensor that adopts the indirect TOF method.

FIG. 1 is a diagram illustrating an external appearance of a vehicle 1 for which a distance sensor 20 (TOF sensor) is provided, according to an embodiment of the present disclosure.

Note that the distance sensor 20 in FIG. 1 serves as distance-measuring equipment, and the vehicle 1 is used to carry baggage to a destination without humans in attendance. In the XYZ three-dimensional rectangular coordinate system of the present disclosure, it is assumed that the direction orthogonal to the road surface is the Z-axis direction, and that the direction of travel of the vehicle 1 is the +X-direction.

Figure 2:
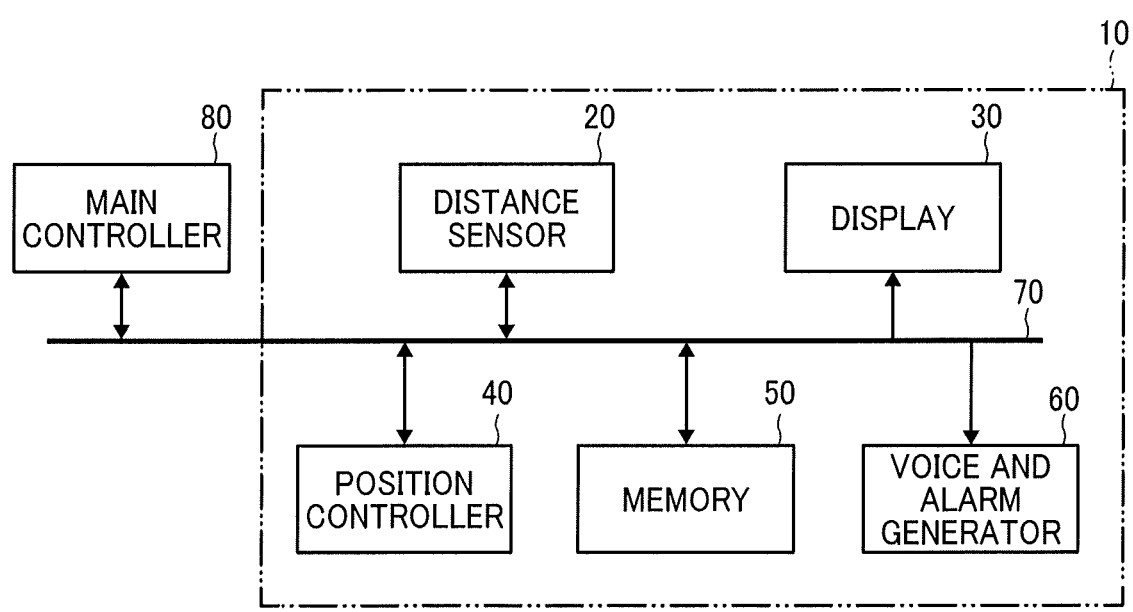
FIG. 2 is a schematic block diagram illustrating a configuration of a traveling control device, according to an embodiment of the present disclosure.

FIG. 2 is a schematic block diagram illustrating a configuration of a traveling control device 10, according to an embodiment of the present disclosure.

In the present embodiment, the distance sensor 20 is attached to the front of the vehicle 1, and obtains the three-dimensional data on the +X side of the vehicle 1. In other words, the distance sensor 20 obtains the three-dimensional data of an area ahead of the vehicle 1. Note also that the area that can be measured by the distance sensor 20 may be referred to as a measurable area. The output from the distance sensor 20 may be used to detect the position information of the vehicle 1 and whether or not there is an obstacle in the directions of travel of the vehicle 1.

As illustrated in FIG. 2, for example, a display 30, a position controller 40, a memory 50, and a voice and alarm generator 60 are provided inside the vehicle 1. These elements are electrically connected to each other through a bus 70 through which data can be transmitted.

In the present embodiment, the traveling control device 10 includes a distance sensor 20, the display 30, the position controller 40, the memory 50, and the voice and alarm generator 60. In other words, the traveling control device 10 is fitted to the vehicle 1. Moreover, the traveling control device 10 is electrically connected to a main controller 80 of the vehicle 1.

Figure 3:
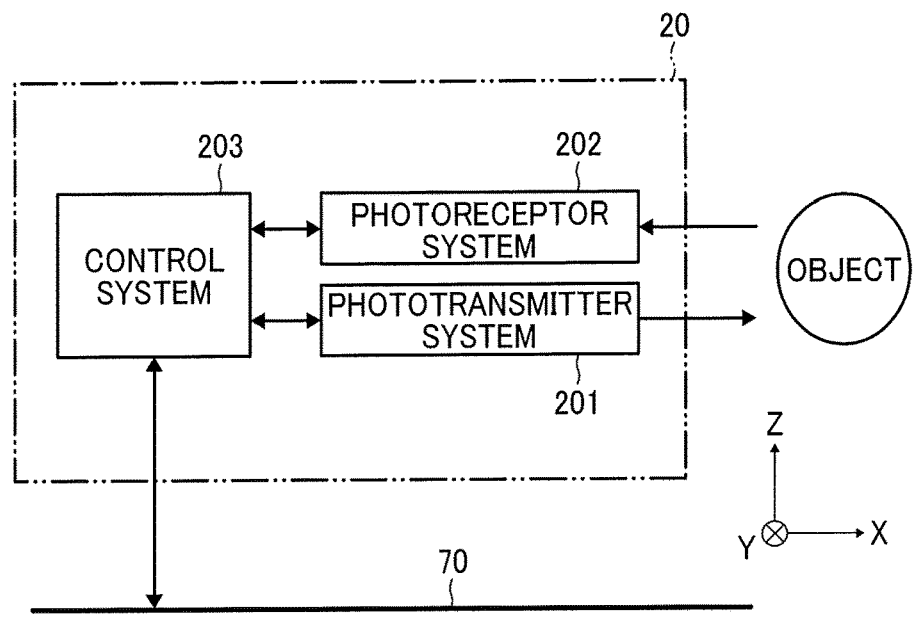
FIG. 3 is a diagram illustrating a configuration of a distance sensor, according to an embodiment of the present disclosure.

FIG. 3 is a diagram illustrating a configuration of the distance sensor 20, according to the present embodiment.

As illustrated in FIG. 3, the distance sensor 20 according to the present embodiment includes, for example, a phototransmitter system 201, a photoreceptor system 202, and a control system 203. These elements are accommodated in a housing. The housing of the distance sensor 20 has a window through which the light emitted from the phototransmitter system 201 and the light reflected by an object and heading for the photoreceptor system 202 pass through, and a glass is fitted to the window.

The voice and alarm generator 60 determines whether or not it is possible to avoid a collision with an obstacle according to, for example, the three-dimensional data obtained by the distance sensor 20, and notifies people around when it is determined that it is impossible to avoid a collision.

In such a use as above, the distance measuring range (distance measurable range) that is required for the distance sensor 20 is determined by the speed of the vehicle 1 and the processing speed of determination made on an obstacle. As the speed of the vehicle 1 is faster, the distance measuring range in which determination is made on an obstacle in advance needs to be made longer.

Figure 4:
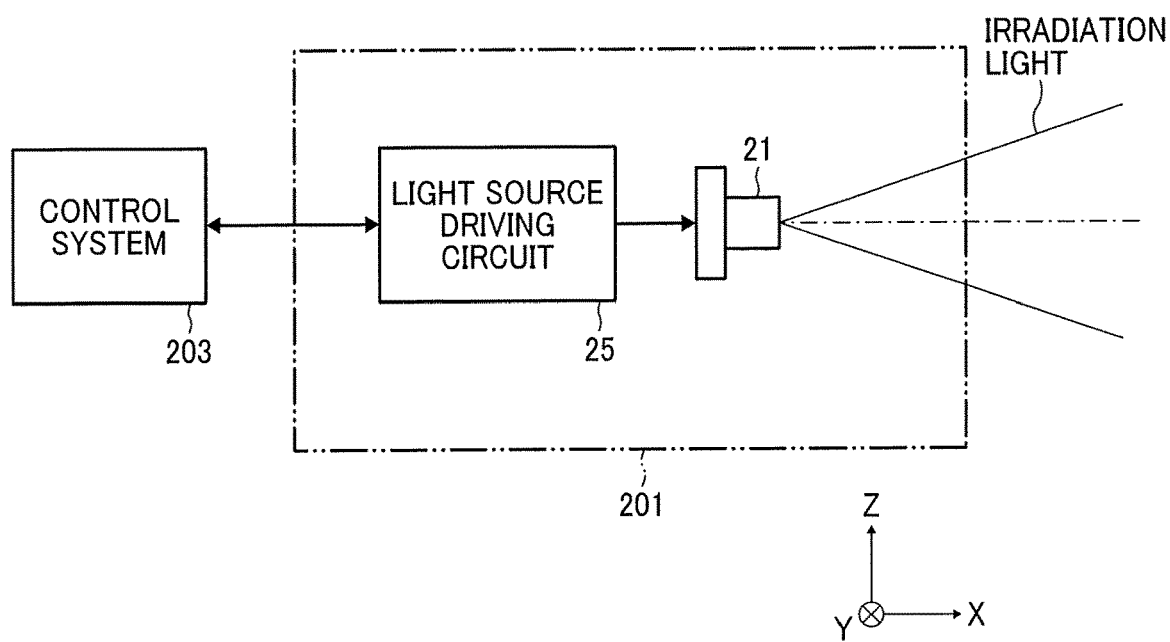
FIG. 4 is a diagram illustrating a phototransmitter system according to an embodiment of the present disclosure.

FIG. 4 is a diagram illustrating the phototransmitter system 201 according to the present embodiment.

In the present embodiment, the phototransmitter system 201 is arranged on the −Z side of the photoreceptor system 202. As illustrated in FIG. 4, the phototransmitter system 201 includes, for example, a light source 21 and a light source driving circuit 25.

The light source 21 is turned on or turned off by the light source driving circuit 25. In the present embodiment, a light-emitting diode (LED) is used as the light source 21. However, no limitation is intended thereby, and for example, another kind of light source such as a semiconductor laser (end-surface emitting laser or surface-emitting laser) may be adopted. In the present embodiment, the light source 21 is arranged so as to emit light in the +X-direction. In the following description, a signal that is generated by the light source driving circuit 25 to drive the light source 21 is referred to as a light-source driving signal.

Figure 5:
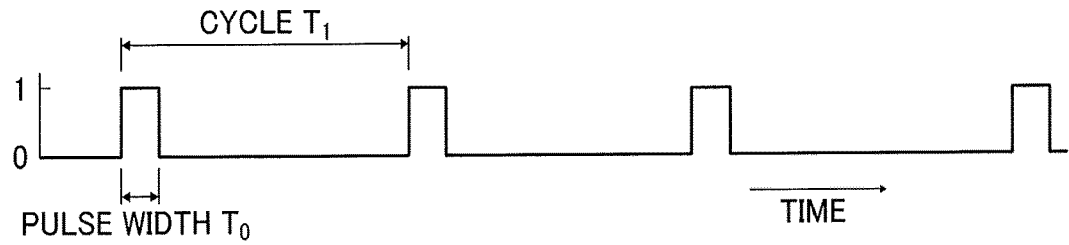
FIG. 5 is a diagram illustrating a light emission control signal according to an embodiment of the present disclosure.

FIG. 5 is a diagram illustrating a light emission control signal according to the present embodiment.

Figure 6:
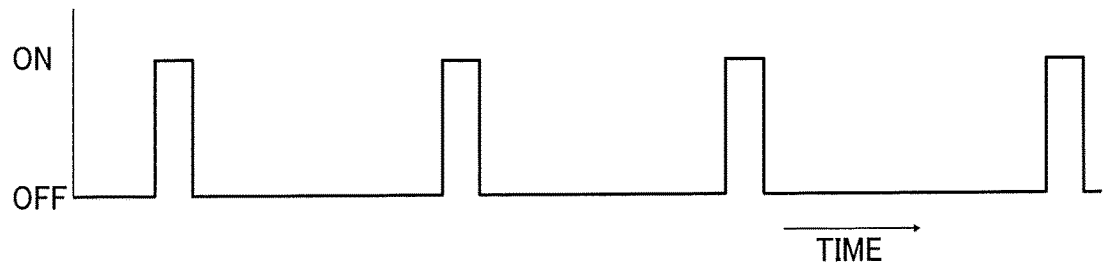
FIG. 6 is a diagram illustrating a light-source driving signal according to an embodiment of the present disclosure.

FIG. 6 is a diagram illustrating a light-source driving signal according to the present embodiment.

The light source driving circuit 25 generates a light-source driving signal (see FIG. 6) based on a light emission control signal (see FIG. 5) sent from the control system 203. The light-source driving signal is sent to the light source 21 and the control system 203.

Due to this configuration, the light source 21 emits the pulsed light of the pulse width specified by the control system 203. Note that the pulsed light that is emitted from the light source 21 is set by the control system 203 such that the duty of the pulsed light will be equal to or less than 50%. Note also that the light that is emitted from the light source 21 may be referred to as irradiation light in the following description. Further, one pulse of irradiation light may be referred to as a pulse of irradiation light.

When the vehicle 1 is driven to move, the main controller 80 of the vehicle 1 sends a request to start position control to the position controller 40. Then, when the vehicle 1 reaches its destination, the main controller 80 of the vehicle 1 sends a request to terminate the position control to the position controller 40.

Upon receiving the request to start the position control or the request to terminate the position control, the position controller 40 sends these requests to the control system 203.

Some of the light that is emitted from the distance sensor 20 and is reflected by an object returns to the distance sensor 20. In the following description, the light that is reflected by the object and returns to the distance sensor 20 may be referred to as "light reflected from an object" or "received light", for purposes of simplification. Further, one pulse of "light reflected from an object" may be referred to as a pulse of received light or a pulse of reflected light.

Figure 7:
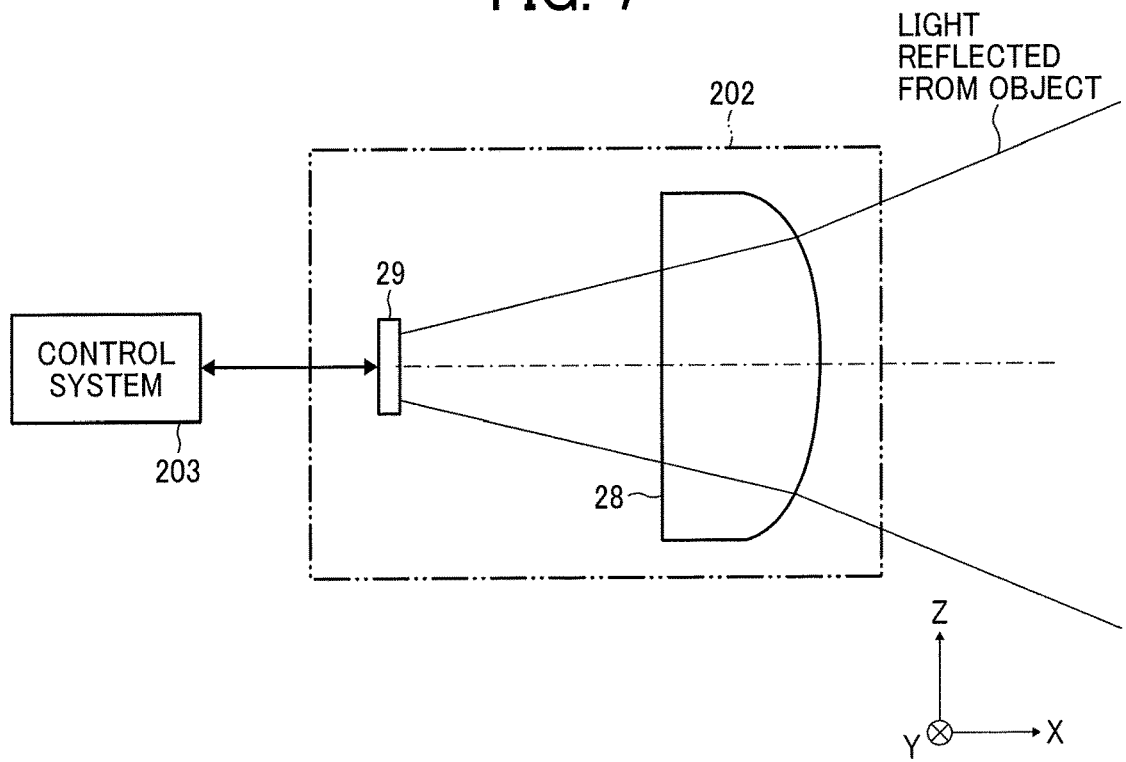
FIG. 7 is a diagram illustrating a photoreceptor system according to an embodiment of the present disclosure.

FIG. 7 is a diagram illustrating the photoreceptor system 202 according to the present embodiment. The photoreceptor system 202 detects the light reflected from an object. As illustrated in FIG. 7, the photoreceptor system 202 according to the present embodiment includes, for example, an image forming optical system 28 and an image sensor (imaging element) 29.

The image forming optical system 28 is disposed in the optical path of the light reflected from an object, and concentrates the light. In the present embodiment, the image forming optical system 28 consists of only one lens. However, in some embodiments, the image forming optical system 28 may include two lenses, or three or more lenses. Alternatively, in some embodiments, a mirror optical system may be employed for the image forming optical system 28.

The image sensor 29 receives the light reflected from an object through the image forming optical system 28. The output signals (analog signals) that are output from the image sensor 29 are converted into digital signals by an analog-digital converter (ADC), and sent to the control system 203. In the present embodiment, an area image sensor such as a charge coupled device (CCD) and a complementary metal oxide semiconductor (CMOS) where a plurality of light receivers are two-dimensionally arranged is used as the image sensor 29. Note also that each of the light receivers of the image sensor 29 may be referred to as a pixel.

The image sensor 29 photoelectrically converts the received light into a plurality of electrical signals on a pixel-by-pixel basis, and sequentially obtains the electrical signals upon being sorted into a plurality of phase signals on a temporal basis.

More specifically, the image sensor 29 is provided with two charge storage units for each one of the light receivers (e.g., photodiodes and phototransistors), and when a Vtx1 signal is at a high level, signal charges that are photoelectrically converted at the light receivers are accumulated in one of the two charge storage units. When a Vtx2 signal is at a high level, signal charges that are photoelectrically converted at the light receivers are accumulated in another one of the two charge storage units. Moreover, the image sensor 29 does not accumulate electrical charge when a Vtxd signal is at a high level, and when a reset signal is at a high level, resets the amount of electric charge accumulated in the two charge storage units to "0".

In other words, the Vtx1 signal and the Vtx2 signal are used to control the period of time during which the image sensor 29 obtains phase signals, and the Vtx1 signal and the Vtx2 signal may be each referred to as an acquisition time control signal in the following description.

Once a readout signal is received from the control system 203, the image sensor 29 transmits an output signal (amount of signal of phase signals) to the control system 203.

Figure 8:
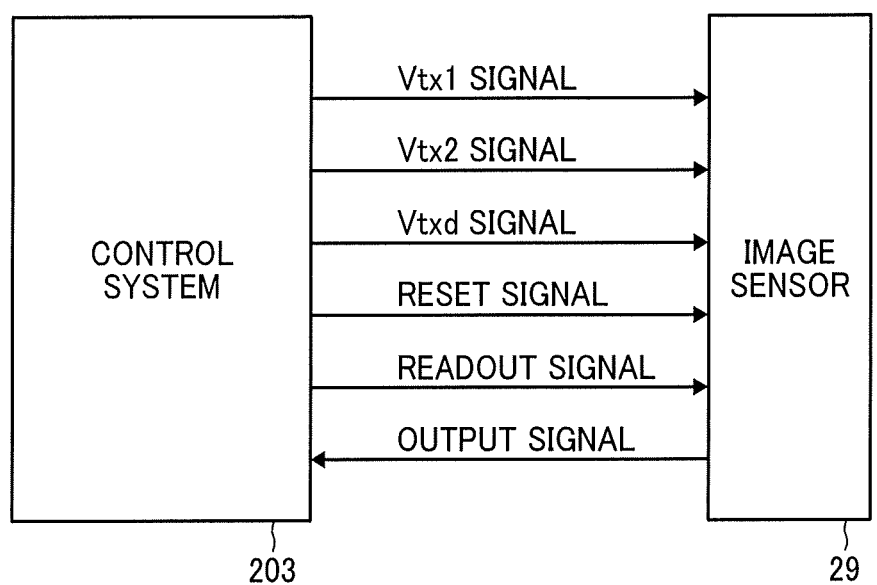
FIG. 8 is a diagram illustrating signals sent between a control system and an image sensor, according to an embodiment of the present disclosure.

FIG. 8 is a diagram illustrating signals sent between a control system and an image sensor, according to the present embodiment.

As illustrated in FIG. 8, for example, the control system 203 outputs a Vtx1 signal, a Vtx2 signal, a Vtxd signal, a reset signal, and a readout signal to the image sensor 29 on a selective manner.

Moreover, the control system 203 outputs a light emission control signal to the light source driving circuit 25 to control the light source 21 to emit pulses of light, and calculates time difference between the timing of light emission at the light source 21 and the timing of light reception at the image sensor 29, based on the output signal sent from the image sensor 29 that has received the pulse of light reflected from an object, to calculate the distance to the object based on the calculated time difference.

Some known TOF sensors obtain the distance to an object typically by performing multi-phase shift. For example, a four-phase TOF sensor obtains such distance using four phase signals (amounts of phase shift: 0°, 90°, 180°, 270°) for the modulation frequency (inverse number of the pulse cycle of irradiation light) of irradiation light that serves as signal light.

There is a limitation on the theoretical distance measurable range of a TOF sensor. Such a distance measurable range is determined by the modulation frequency of irradiation light. For example, a four-phase TOF sensor cannot measure an area where time of flight of irradiation light is longer than twice the pulse width of the irradiation light, and due to a phenomenon called aliasing, the output distance becomes cyclic with reference to the measurable distance. In other words, as the pulse width of the irradiation light (i.e., the pulse width of a light-source driving signal) is wider and the modulation frequency is lower, the maximum measurable distance of the TOF sensor becomes even longer and the distance measurable range becomes even wider.

The accuracy of distance measurement of a TOF sensor is determined by the modulation frequency of irradiation light, and as the modulation frequency is higher and the pulse width is shorter, the accuracy improves. In many applications expected of a TOF sensor, both a wide distance measurable range and distance measurement with a high degree of accuracy are demanded, and in such a configuration, measures need to be taken to avoid aliasing effects (anti-aliasing technology).

In most of the known anti-aliasing technologies, phase signals are obtained using the irradiation light of a plurality of modulation frequencies, and the obtained phase signals are used for TOF computation. In such a configuration, first of all, the light source and the imaging element need to be driven at a plurality of frequencies, and thus one of or both the mechanism and the control system of a TOF sensor may become complicated. Further, the number of phase signals that need to be obtained from one frame, from which a distance value is to be output, also increases, and thus the frame configuration may become complicated.

Figure 9A:
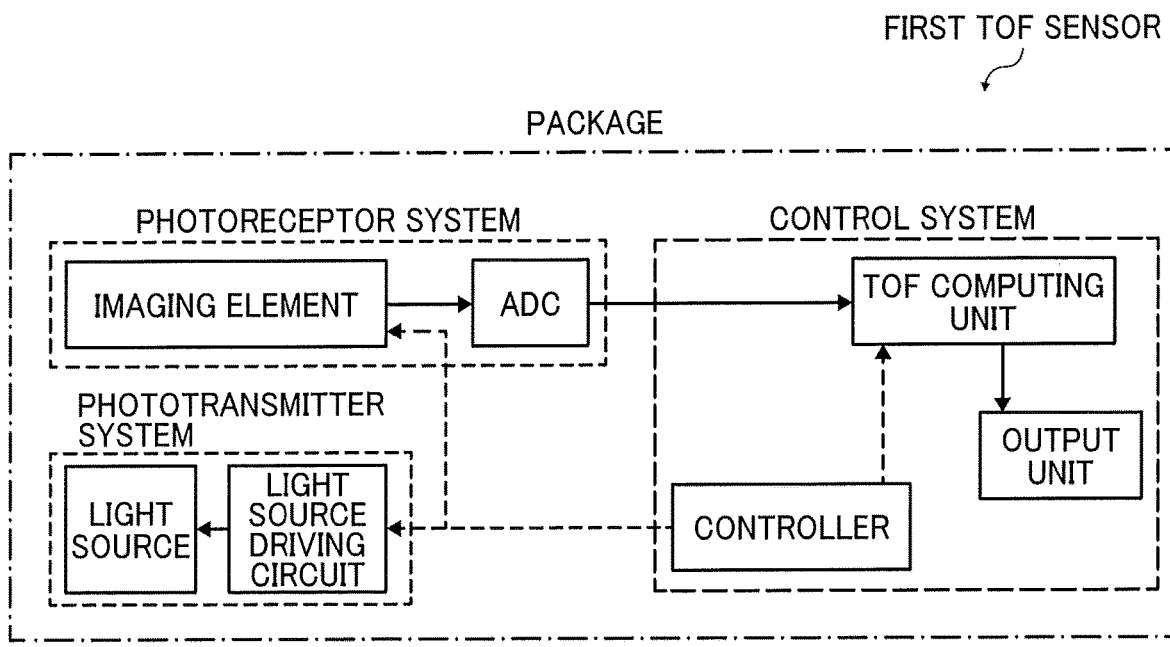
FIG. 9A and FIG. 9B are diagrams each illustrating an example configuration of a known TOF sensor.

FIG. 9A is a diagram illustrating a configuration of a first known TOF sensor that becomes a basis for the distance sensor 20 according to the present embodiment.

Figure 9B:
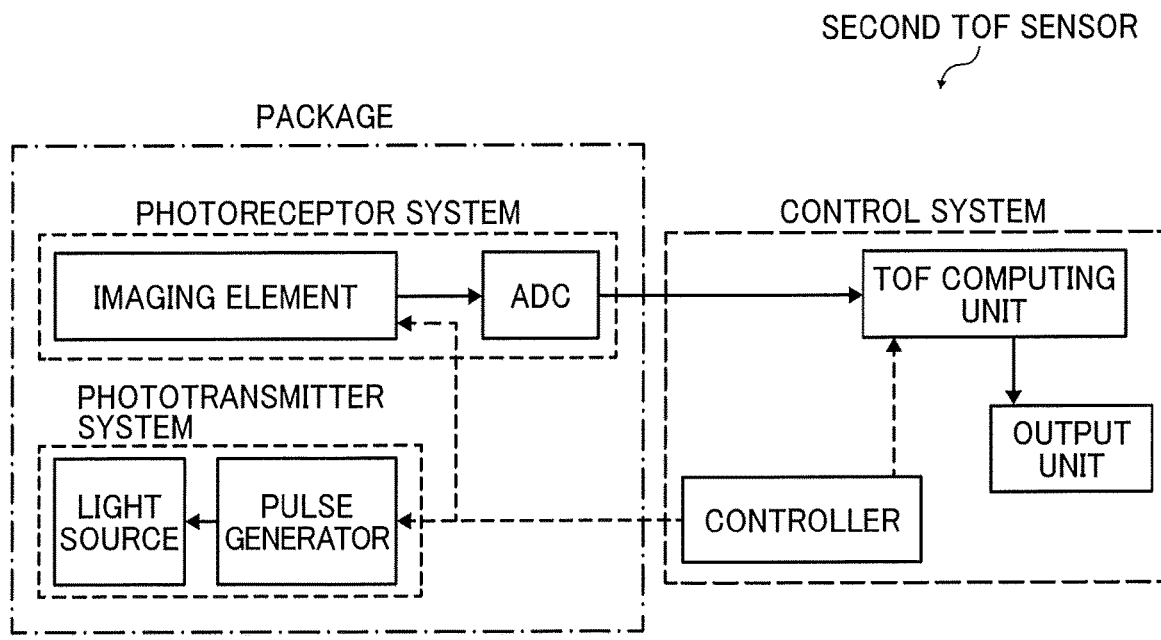

FIG. 9B is a diagram illustrating a configuration of a second known TOF sensor that becomes a basis for the distance sensor 20 according to the present embodiment.

As illustrated in FIG. 9A, the first TOF sensor includes a phototransmitter system including a light source and a light source driving circuit, a photoreceptor system including an imaging element and an analog-digital converter (ADC), and a control system including a controller, a time-of-flight (TOF) computing unit, and an output unit.

The elements of the first TOF sensor are electrically connected to each other through a bus through which data can be transmitted, and are accommodated in a package.

While the first TOF sensor is measuring distances, the controller controls the light source driving circuit of the phototransmitter system and the imaging element of the photoreceptor system. In so doing, the controller sends a signal (light emission control signal) for setting the pulse width and duty ratio of a light-source driving signal to the light source driving circuit, and sends an acquisition time control signal to the imaging element in view of the pulse width.

In the light emitting system, as instructed by the controller (based on a light emission control signal) the light source driving circuit controls the light source to emit pulses of light. As known in the art, for example, a laser diode (LD) (end-surface emitting laser), a light-emitting diode (LED), a vertical-cavity surface-emitting laser (VCSEL) may be used for the light source.

In the photoreceptor system, the imaging element receives some of the light reflected by an object and generates an analog signal, and the ADC converts the generated analog signal into a digital signal and sends the digital signal to the TOF computing unit. The imaging element may be composed of, for example, a complementary metal oxide semiconductor (CMOS) and a charge coupled device (CCD). In known TOF sensors, dedicated imaging elements are used.

By way of example, a CMOS that is designed specifically for TOF sensors, so called TOF-CMOS, is described. In most cases, a TOF-CMOS has structure in which electrical charge is distributed to two sides from one light receiver. Such a TOF sensor, which has structure in which electrical charge is distributed to two sides from one light receiver, requires exposure at least twice.

Figure 10:
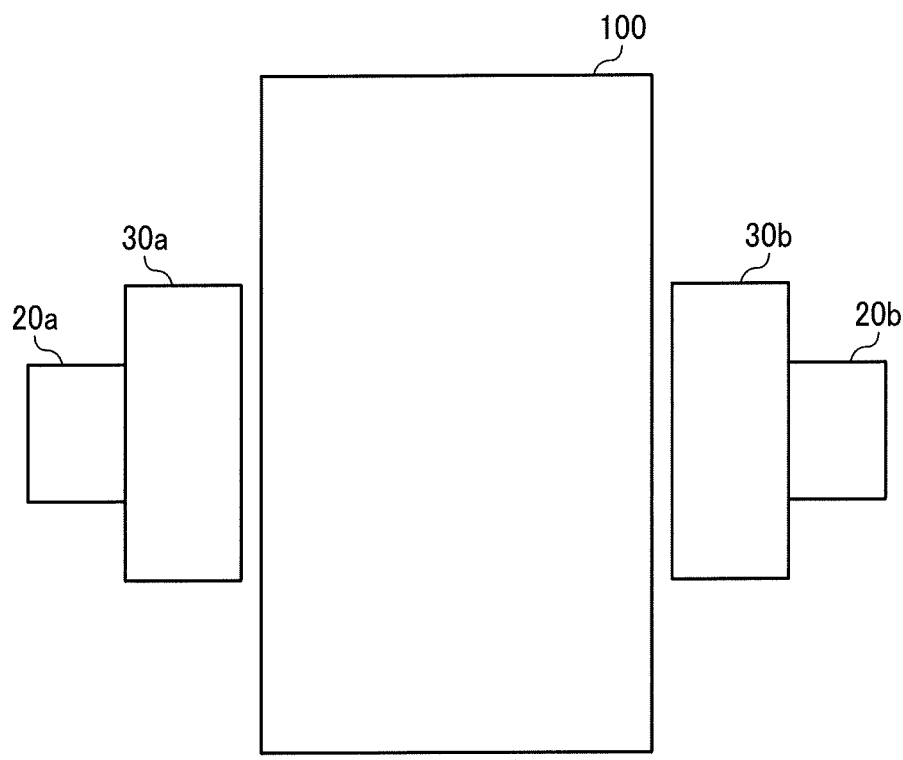
FIG. 10 is a diagram illustrating structure in which electrical charge is distributed to two sides from one light receiver, according to an embodiment of the present disclosure.

FIG. 10 is a diagram illustrating structure in which electrical charge is distributed to two sides from one light receiver 100, according to the present embodiment.

As illustrated in FIG. 10, a first charge storage unit 20a and a second charge storage unit 20b are disposed on right and left sides of the light receiver 100. Moreover, a first charge transfer unit 30a is disposed between the light receiver 100 and the first charge storage unit 20a, and a second charge transfer unit 30b is disposed between the light receiver 100 and the second charge storage unit 20b. The light receiver 100 converts the received light into signal charges. Some of the signal charges is sent to the first charge storage unit 20a through the first charge transfer unit 30a, and some of the signal charges other than the above some of the signal charges is sent to the second charge storage unit 20b through the first charge transfer unit 30b.

In such a configuration, for example, the signal (light signal) that is obtained in one-time light reception may be distributed into a phase component of 0° and a phase component of 180°.

Theoretically, structure in which electrical charge is distributed to three or more sides from one light receiver may be adopted, and the signal (light signal) that is obtained in one-time light reception may be distributed into three or more phase components. However, if the number of sides to which electrical charge is distributed is increased, the proportion of the area of charge storage or its supplemental structure in the pixel area increases, and the area of the light receiver is reduced accordingly. As a result, the level of sensitivity becomes insufficient. For the above reasons, it is undesired to indiscriminately increase the number of sides to which electrical charge is distributed.

In view of the above circumstances, a TOF sensor such as a four-phase TOF sensor requires phase signals of a larger number of phases, to perform computation, than the number of destinations (i.e., the number of charge storage units) to which electrical charge is to be distributed in the pixels of the imaging element.

In order to handle such a situation, in many cases, signals are obtained upon dividing one frame into so called subframes for obtaining phase signals. Accordingly, all the desired phase data can be obtained.

The TOF computing unit performs TOF computation using the value of the modulation frequency of irradiation light and the amounts of signal of the phase signals sent from the imaging element. The TOF computation will be described later in detail.

A distance value that is calculated by the TOF computing unit is output from the output unit in a predetermined format.

In the first TOF sensor illustrated in FIG. 9A, all the elements are accommodated in a single package. However, as in the second TOF sensor illustrated in FIG. 9B, only the phototransmitter system and the photoreceptor system may be accommodated in a package, and the control system may be configured by separate hardware such as a personal computer (PC). In other words, TOF sensors may include not only a configuration in which a phototransmitter system, a photoreceptor system, and a control system are integrated but also a configuration in which at least one of the phototransmitter system, the photoreceptor system, and the control system is independent of the other systems.

First of all, the sinusoidal modulation technique, which is one typical example of the principle of distance measurement in the TOF method, is described with reference to FIG. 11.

Figure 11:
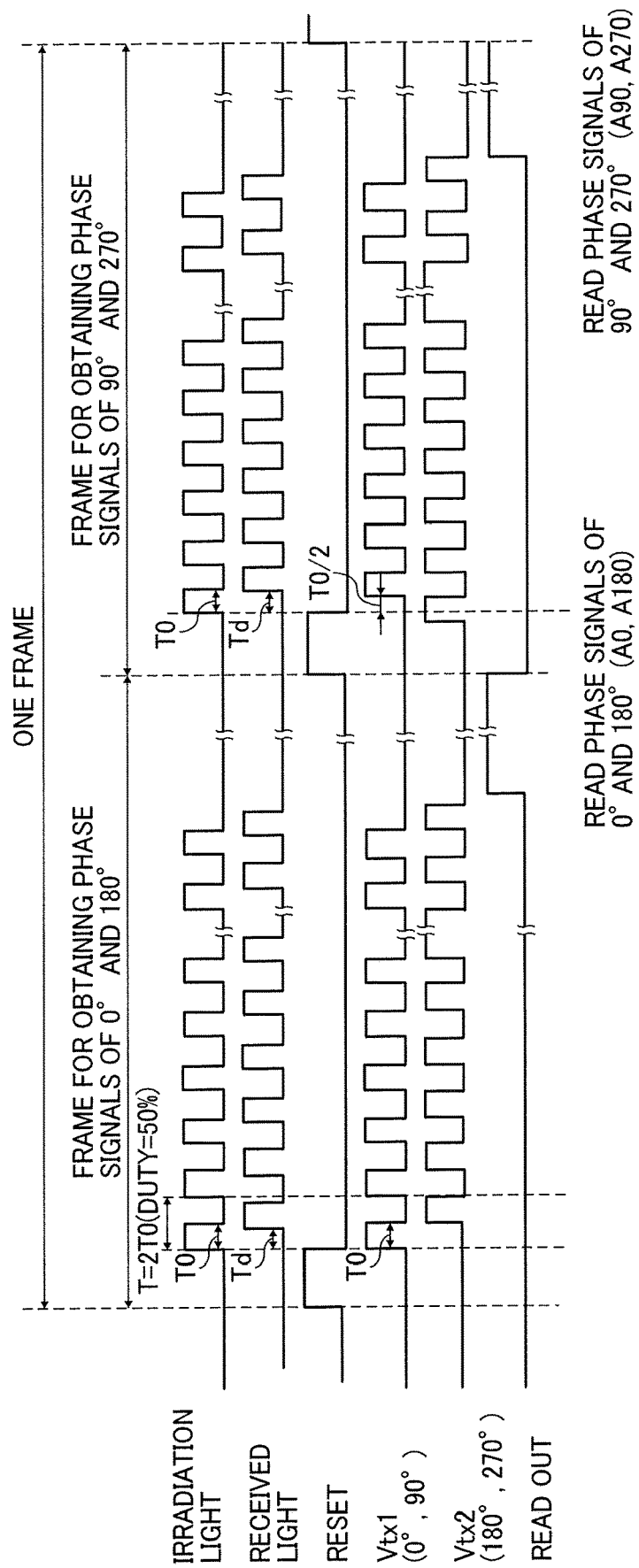
FIG. 11 is a timing chart illustrating one frame of four-phase sinusoidal modulation technique, according to an embodiment of the present disclosure.

FIG. 11 is a timing chart illustrating one frame of four-phase sinusoidal modulation technique, according to the present embodiment.

In the sinusoidal modulation technique, received light is detected upon being temporally divided into three or more lights and multiple phase signals are obtained, and these obtained phase signals are used to obtain a delay time Td of the timing at which the received light is detected with reference to the timing at which the emitted light is output, in the computation of a phase difference angle. FIG. 11 illustrates the configuration of one frame used in measurement by a four-phase sinusoidal modulation technique.

As illustrated in FIG. 11, one frame is divided into two subframes, i.e., a frame for obtaining phase signals of 0° and 180° and a frame for obtaining phase signals of 90° and 270°. All of the multiple subframes start from reset operation and end at readout operation.

In the reset operation, the signals in a readout unit (i.e., the charge storage unit) are once electrically drawn up and reset. Note that there is no difference in the pulse width T0 of irradiation light, the pulse cycle T, and the delay time Td between the two subframes.

In this configuration, the pulse cycle T is determined by the pulse width and the duty ratio, and by way of example, FIG. 11 illustrates a case in which the duty ratio is 50%. What is significantly different between the two subframes is in the timings of the Vtx1 signal and the Vtx2 signal.

Assuming that the two charge storage units to which electrical charge is to be distributed in the aforementioned TOF-CMOS structure are the first and second charge storage units, respectively, when a Vtx1 signal is at a high level, the electrical charge is distributed to the first charge storage unit.

On the other hand, when a Vtx2 signal is at a high level, the electrical charge is distributed to the second charge storage unit.

In the frame for obtaining phase signals of 0° and 180°, the controller executes the Vtx1 signal with the same timing as the irradiation light, and executes the Vtx2 signal at the timing later than the rising edge of the irradiation light by the pulse width T0 of the irradiation light. Then, the controller sends the Vtx1 signal and the Vtx2 signal to the imaging element in a repeated manner.

By contrast, in the frame for obtaining phase signals of 90° and 270°, the controller executes the Vtx1 signal at the timing later than the rising edge of the irradiation light by T0/2, and executes the Vtx2 signal at the timing earlier than the rising edge of the irradiation light by T0/2. Then, the controller sends the Vtx1 signal and the Vtx2 signal to the imaging element in a repeated manner.

The phase signals are distributed into two and each of the subframes has a period at the tail end in which the phase signals are read. The four phase signals in total in the two subframes are read by the controller, and sent to the TOF computing unit. The two subframes are in different time periods in a single frame, but the phase signals are read in a sufficiently short interval of the single frame. For this reason, it may be assumed that there is almost no difference in time between the two subframes.

Accordingly, the amounts of signal that the TOF sensor obtains from received light are equal to each other among the subframes. In short, the phase signals have the relation as in Formula (1) given below.

$$A0 + A180 = A90 + A270 \tag{1}$$

For example, in view of cases in which the distance between the TOF sensor and an object is short and the delay time Td as illustrated in FIG. 11 is small, the four phase signals of A0, A90, A180, and A270 are obtained by temporally dividing a signal into four phases of 0°, 90°, 180°, and 270°, respectively, with reference to the pulse cycle of the irradiation light. Accordingly, a phase difference angle φ can be obtained from Formula (2) given below.

$$\varphi = \mathrm{Arctan}\{(A90 - A270)/(A0 - A180)\} \tag{2}$$

A delay time Td can be obtained by formula (3) given below using phase difference angle φ.

$$Td = \varphi/2\pi \times T \tag{3}$$

(T=2T0, T0: Pulse Width of Irradiation Light)

The distance value d of the distance to an object can be obtained by Formula (4) given below using the delay time Td.

$$d = Td \times c/2 \tag{4}$$

(c: Speed of Light)

In such a method of computing a phase difference as above, an optimal waveform of irradiation light that enhances the performance of distance measuring in the sinusoidal modulation technique is a sinusoidal waveform. In the TOF computation of the sinusoidal modulation technique, the maximum distance measurable range is determined by the pulse width T0 of the irradiation light. In the sinusoidal modulation technique, an area where the delay time Td is equal to or smaller than twice as much as the pulse width T0 of the irradiation light can be measured. For example, when the pulse width T0 of the irradiation light is 30 nanoseconds (ns), the distance measurable range is between 0 to 9 meters (m).

Secondly, the rectangular modulation technique, which is another typical example of the principle of distance measurement in the TOF method, is described with reference to FIG. 12.

Figure 12:
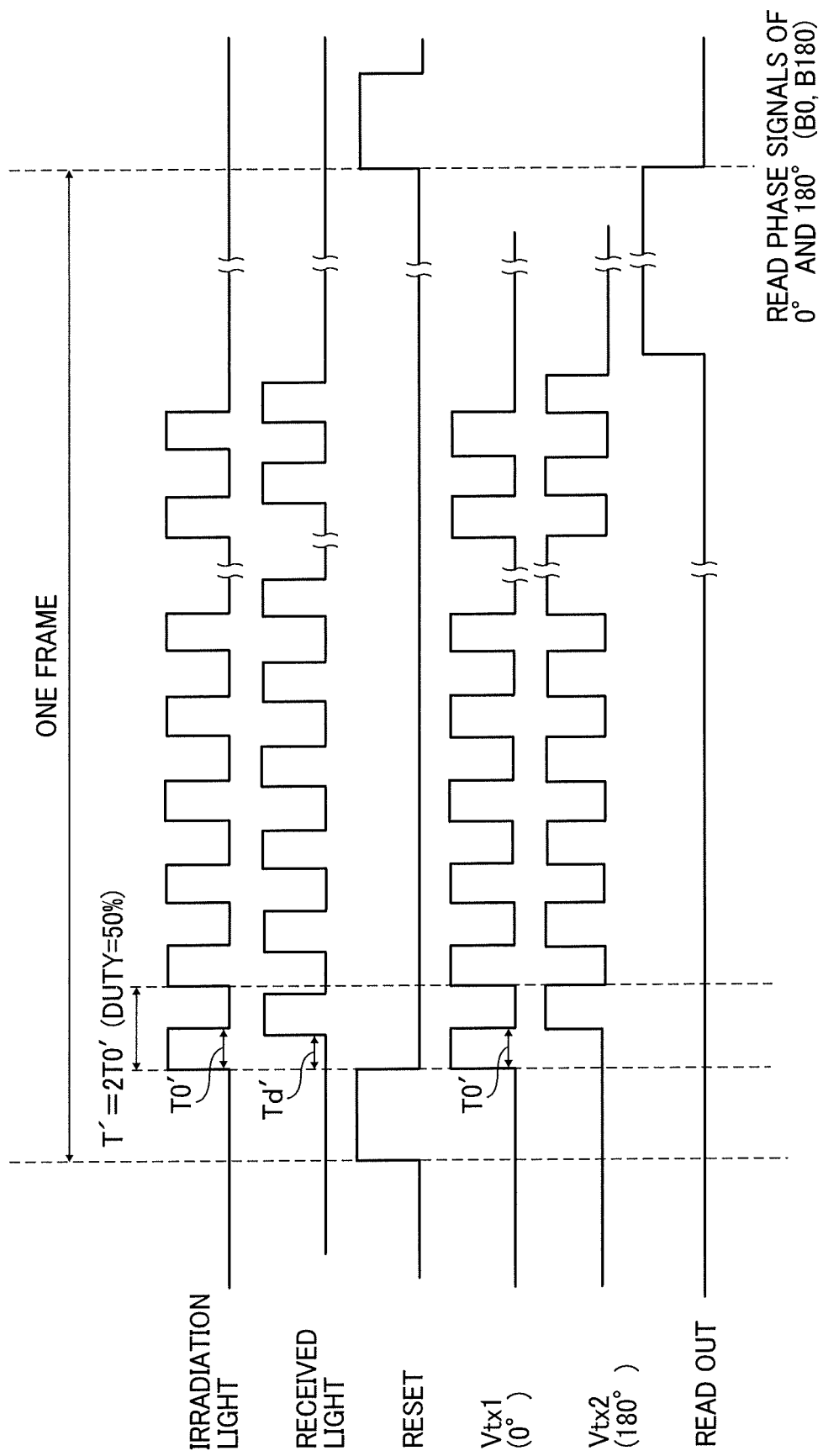
FIG. 12 is a timing chart illustrating one frame of two-phase rectangular modulation technique, according to an embodiment of the present disclosure.

FIG. 12 is a timing chart illustrating one frame of two-phase rectangular modulation technique, according to the present embodiment.

In the rectangular modulation technique, the delay time Td' of the rising edge of the received light with reference to the rising edge of the irradiation light is obtained, using the multiple phase signals obtained by temporally dividing the detected light signal.

By way of example, a method of computing a phase difference using the two-phase rectangular modulation technique is described with reference to FIG. 12. Due to frame configuration illustrated in FIG. 12, phase signals (A0', A180') that are temporally divided into two phases of 0° and 180° are obtained, and a delay time Td' of the received light can be obtained by Formula (5) given below.

$$Td' = \{A180'/(A0' + A180')\} \times T0' \tag{5}$$

(T0': Pulse Width of Irradiation Light)

In a similar manner to Formula (5) as above, the distance value d' of the distance to an object can be obtained by Formula (6) given below using the delay time Td'.

$$d' = Td' \times c/2 \tag{6}$$

(c: Speed of Light)

Previously, it is assumed that the duty ratio is 50%. On this account, the modulation frequency of irradiation light is referred to in the description above. However, the pulse width of the irradiation light (T0, T0') is a key factor according to the principle of TOF method. If an implementation where the duty ratio is less than 50% is taken into consideration, it is more preferable to the pulse width of the irradiation light for control, rather than the modulation frequency of irradiation light.

In such a method of computing a phase difference as above, an optimal waveform of irradiation light that enhances the performance of distance measuring in the rectangular modulation technique is a rectangular waveform.

Also in the TOF computation of the rectangular modulation technique, the maximum distance measurable range is determined by the pulse width T0 of the irradiation light. In the rectangular modulation technique, an area where the delay time Td is equal to or smaller than the pulse width T0 of the irradiation light can be measured. For example, when the pulse width T0 of the irradiation light is 30 nanoseconds (ns), the distance measurable range is between 0 to 4.5 m.

When the sinusoidal modulation technique and the rectangular modulation technique are compared with each other on condition that the irradiation light of the same pulse width is used, the distance measurable range of the sinusoidal modulation technique is twice broader. For this reason, if it is desired that the distance measurable range be broadened, the sinusoidal modulation technique is more preferable.

As described above, in TOF sensors, the distance measurable range is determined by the modulation frequency of irradiation light. For this reason, if it is desired that the distance measurable range be widened, the modulation frequency needs to be lowered. This is because when the distance to an object becomes further than the distance measurable range, aliasing occurs and the phase becomes repetitive and indistinguishable.

Figure 13A:
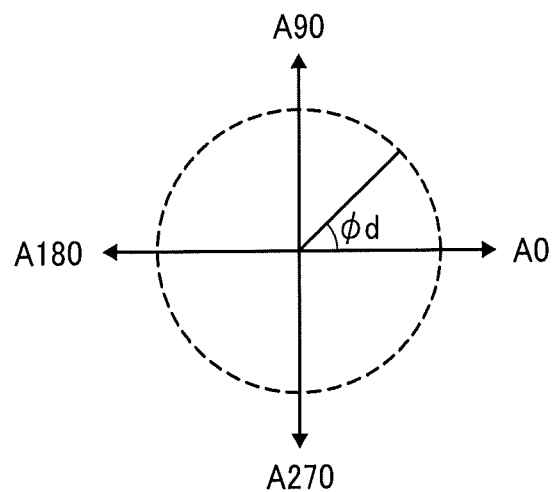
FIG. 13A is a diagram illustrating the relation between a phase signal and a phase difference angle φd, according to an embodiment of the present disclosure.

FIG. 13A is a diagram illustrating the relation between a phase signal and a phase difference angle φd, according to the present embodiment.

Such aliasing as above occurs when the phase difference angle φd that is determined by the multiple phase signals, as illustrated in FIG. 13A, exceeds 2π, and the TOF sensor outputs the same distance value at regular time intervals due to the aliasing.

Figure 13B:
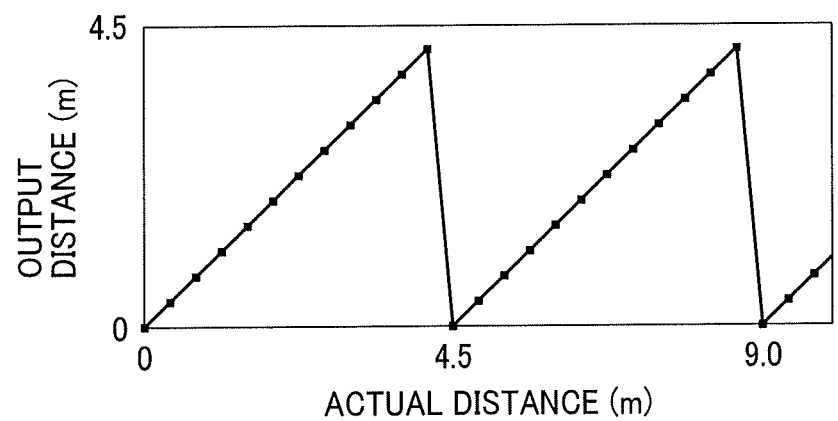
FIG. 13B is a diagram illustrating the relation between output distance and actual distance, according to an embodiment of the present disclosure.

FIG. 13B is a diagram illustrating the relation between the output distance and the actual distance, according to the present embodiment.

FIG. 13B illustrates an example of actual aliasing when the four-phase TOF sensor is used with the pulse width of the irradiation light being 15 ns, and indicates that the output distance becomes repetitive in an area where the distance measuring range exceeds 4.5 m.

As the distance measuring range is a significant key factor in view of the application of TOF sensors, it is desired that the TOF computation and the modulation frequency of irradiation light be selected and set to be within a desired range. As the pulse width of the irradiation light is wider and the modulation frequency is lower, the maximum measurable distance of the TOF sensor becomes even longer and the distance measurable range becomes even wider.

Below is a more detailed explanation about the aliasing. In the explanation given below, a four-phase TOF sensor is used as an example. As illustrated in FIG. 13A, in the four-phase TOF, the phase signals of A0, A90, A180, and A270 that are temporally divided into four phases of 0°, 90°, 180°, and 270° can be associated with phase difference angle φd. The phase difference angle φd continuously changes between 0 and 2π. Accordingly, as illustrated in FIG. 13B, distance values are cyclically output as output distance in the distance measurable range where φd corresponds to the range of 0 to 2π. Such cyclic and repetitive output distance is referred to as aliasing. As measures against such aliasing (anti-aliasing), technology is known in the art in which irradiation light of a plurality of modulation frequencies are used differently to achieve compatibility between the accuracy of distance measurement and the distance measurable range.

By contrast, as will be described below in detail, in the present embodiment, the distance measurable range can be expanded without irradiation light of a plurality of modulation frequencies.

FIG. 14 is a timing chart in known four-phase TOF sensors illustrating the relation among irradiation light, received light, acquisition time control signals (Vtx1, Vtx2), and phase signals.

In FIG. 14, "Apulse" indicates all the amounts of signal of the pulse of received light in the TOF sensor, and A0 to A270 indicate the amounts of signal of the multiple phase signals.

"Apulse" is expressed in Formula (7) given below using irradiation light intensity F and a coefficient P including, for example, the reflectance of an object and the level of light-receptive sensitivity of an imaging element.

$$F \times P = A\text{pulse} \quad (7)$$

In the following description, no distinction is made between cases in which a plurality of phase signals, for example, A0, A90, A180, A270, and Apulse in a four-phase method, are defined with reference to one pulse of irradiation light and cases in which the whole quantity of phase signals obtained in two or more frames for measurement is defined. When the whole quantity of phase signals obtained in two or more frames for measurement is defined, the amount of signal is multiplied by the number of times the light source has emitted light compared with the case of one pulse of irradiation light.

In the four-phase TOF sensors, "Apulse" is expressed in Formula (8) given below.

$$A0 + A180 = A90 + A270 = A\text{pulse} \quad (8)$$

Figure 15:
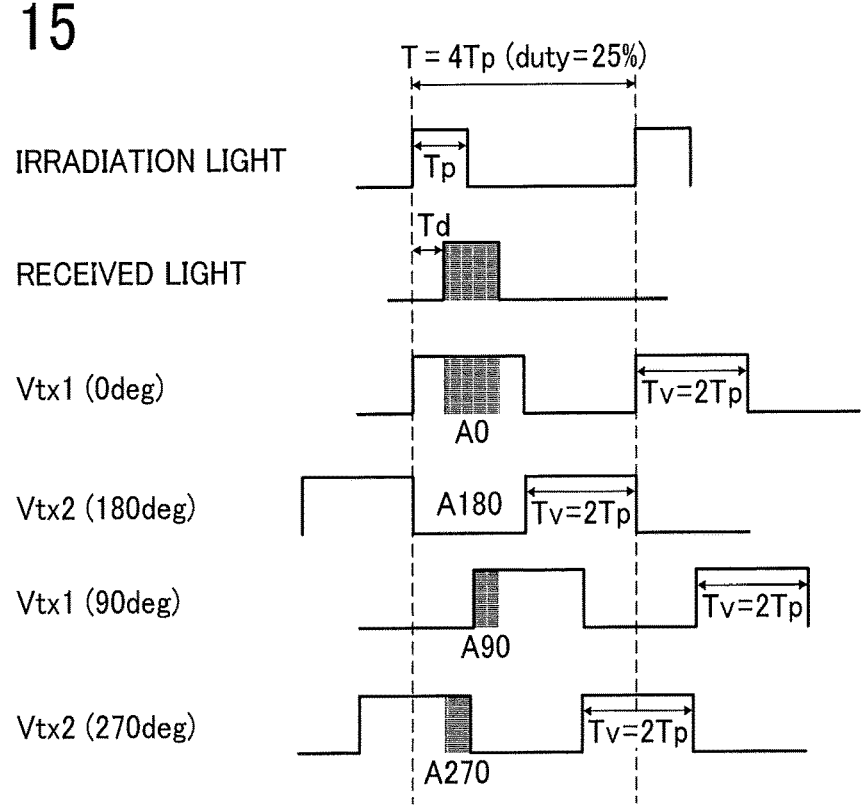
FIG. 15 is a timing chart illustrating the relation among irradiation light, received light, phase signals, and acquisition time control signals when a four-phase distance sensor according to an embodiment of the present disclosure has received light.

FIG. 15 is a timing chart illustrating the relation among irradiation light, received light, acquisition time control signals (Vtx1, Vtx2), and phase signals, in the distance sensor 20 (i.e., a four-phase TOF sensor) according to the present embodiment.

In the known four-phase TOF sensors as illustrated in FIG. 14, the pulse width of the acquisition time control signal is set to be equivalent to the pulse width of the irradiation light (i.e., the pulse width of a light-source driving signal). By contrast, in the distance sensor 20 according to the present embodiment, as illustrated in FIG. 15, the pulse width Tv of the acquisition time control signal is set to be two times greater than the pulse width Tp of the irradiation light.

Table 1 depicts an example of TOF computation performed by the distance sensor 20 according to the present embodiment. In the distance sensor 20, the TOF computing expression varies according to the amounts of signal of the phase signals. As illustrated in FIG. 15, in the distance sensor 20, the range where the delay time Td≤4Tp, with reference to the pulse width of the irradiation light, is measurable.

Accordingly, the distance sensor 20 according to the present embodiment has a doubled distance measurable range compared with when the known four-phase TOF sensors are used with the pulse width of the same irradiation light. When compared with a known four-phase TOF sensor whose pulse width of irradiation light is expanded such that the distance measurable range will be equal to that of the distance sensor 20, the distance sensor 20 has a smaller duty ratio and has a shorter pulse width of irradiation light. Accordingly, the luminance level of light reception in the distance sensor 20 becomes low. However, on normal condition that the luminance level is sufficient, the pulse width has a greater impact on the accuracy of distance measurement than the luminance level. For this reason, the distance sensor 20 according to the present embodiment where the pulse width of the irradiation light is not lengthened has an advantage in the accuracy of distance measurement over the known four-phase TOF sensors where the pulse width of the irradiation light is lengthened.

TABLE 1

| Condition | Formula for TOF Computation |
| --- | --- |
| A0 > A90, A180, A270 | d = (A90-A180)/(A0-A180) × Tp × c/2 |
| A0, A90 > A180 = A270 | d = Tp × c/2 |
| A90 > A0, A180, A270 | d = (Tp + (A180-A270)/(A90-A270)) × Tp × c/2 |
| A90 = A180 > A0 = A270 | d = Tp × c |
| A180 > A0, A90, A270 | d = (2Tp + (A270-A0)/(A180-A0) × Tp) × c/2 |
| A180 = A270 > A0 = A90 | d = 3Tp × c/2 |
| A270 > A0, A90, A180 | d = (3Tp + (A0-A90)/(A270-A90) × Tp) × c/2 |
| A0 = A270 > A90 = A180 | d = 2Tp × c |

FIG. 15 and Table 1 merely give an example of the TOF computation performed by the distance sensor 20 according to the present embodiment, and no limitation is intended thereby. In other words, the TOF computation in the present disclosure is not limited to four-phase TOF computation.

Figure 16:
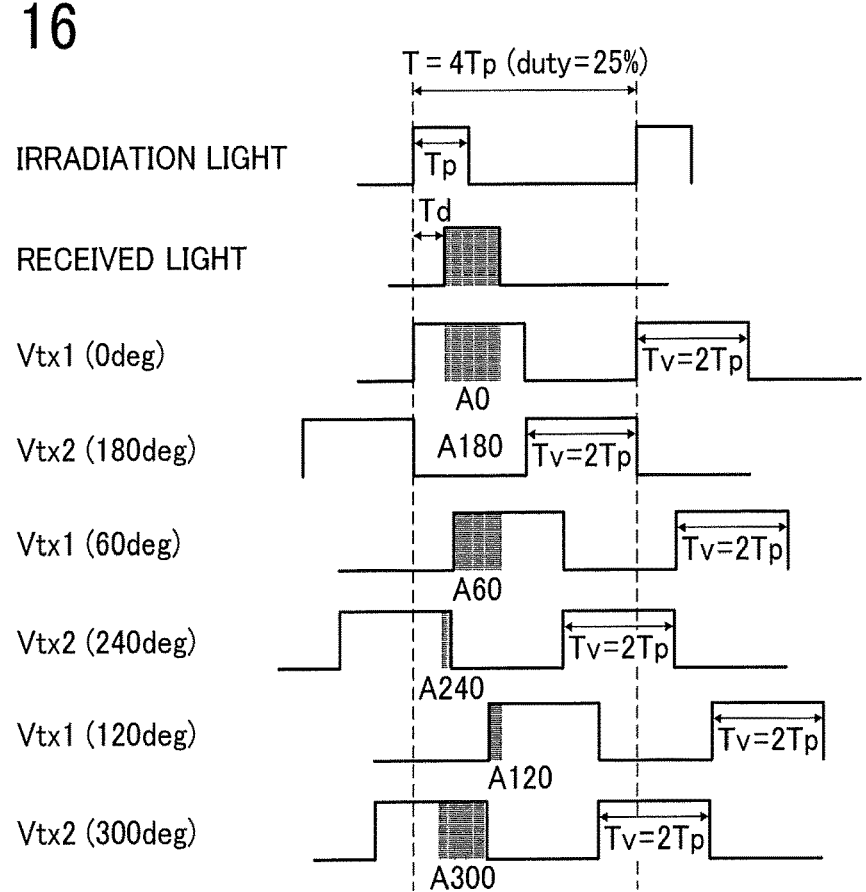
FIG. 16 is a timing chart illustrating the relation among irradiation light, received light, phase signals, and acquisition time control signals when a six-phase distance sensor according to an embodiment of the present disclosure has received light.

FIG. 16 is a timing chart illustrating the relation among irradiation light, received light, acquisition time control signals (Vtx1, Vtx2), and phase signals when six-phase TOF computation is performed in the distance sensor 20 according to the present embodiment.

As illustrated in FIG. 16, when six-phase TOF computation is performed in the distance sensor 20, the pulse width Tv of the acquisition time control signal is set to be two times greater than the pulse width Tp of the irradiation light, and the distance measurable range is twice greater than that of a known six-phase TOF sensors.

Next, the TOF computation of the distance sensor 20 according to the present embodiment is described in detail. When the distance sensor 20 is used in a simplest manner, the magnification M of the distance measurable range R' of the distance sensor 20, which is compared with the distance measurable range of the known TOF sensors, is determined by the number N of phase signals that are obtained by the distance sensor 20 as in Formula (9) and Formula (10) given below.

$$N/(N-2) \leq M \leq N/2 \quad (9)$$

$$R' = M \times R \quad (10)$$

In this configuration, the pulse width Tv of the acquisition time control signal and the pulse width Tp of the irradiation light are determined as in formula (11) given below.

$$M = Tv/Tp \quad (11)$$

According to the conditions in Formula (9) to Formula (11) as above, at all times, at least one of the multiple phase signals is obtained at a timing when no reflection light from an object is received. For this reason, in the TOF computation, an offset component of signal due to, for example, disturbance light and dark current can be eliminated. For this reason, the distance sensor 20 according to the present embodiment is more tolerant of disturbance light.

When N-phase TOF computation is performed in the distance sensor 20 according to the present embodiment, the distance value d of the distance to an object is obtained in formula (12) given below, where A(i) indicates the amount of signal of the phase signal with the maximum amount of signal, "i" indicates the amount of phase shift (°) of A(i) with reference to the pulse of irradiation light, and "q" indicates 360/N that serves as the step size (°) of the amount of phase shift.

$$d = (To + (A(i+q) - A(i+180))/(A(i) - A(i+180)) \times Tp) \times c/2 \quad (12)$$

In Formula (12) as above, the amount of phase shift i of A(i) is defined as follows.

$$0 \leq i < 360$$

Assuming that the amount of phase shift (°) of the obtained phase signal is "x" and the obtained phase signal is Ax, Formula (13) is established as follows.

$$Ax = A(x \pm 360) \quad (13)$$

"To" in Formula (12) as above indicates the offset component of the delay time, which is determined by A(i). "To" is expressed in Formula (14) given below.

$$To = h \times Tp \quad (14)$$

"h" in the above formula (14) is a variable expressed in formula (15) given below.

$$h = \{M(i+q)/180\} - 1 \quad (15)$$

Even when there are a plurality of phase signals whose amount of signal is equivalent to A(i) among the obtained phase signals, Formula (12) as above holds true with any desired one of the phase signals. Depending on "A(i)" used in the calculation, the above formula (12) may indicate a negative value. This is because as expressed in Formula (10) as above, the phase signal Ax that is obtained by the distance sensor 20 cannot be distinguished from A(x+360). For this reason, as in Formula (16) and Formula (17) given below, the phase signals to be output needs to be corrected to a correct distance value dc depending on the value of "d". When d≤0, the phase signals to be output are to be corrected as in Formula (16) given below.

$$dc = d + R' \quad (16)$$

When d>0, the phase signals to be output are to be corrected as in Formula (17) given below.

$$dc = d \quad (17)$$

In Formula (12) above, the denominator may be replaced as in Formula (18) given below.

$$A(i) - A(i+180) = A(i-q) + A(i-q+180) - 2 \times A(i+180) \quad (18)$$

Accordingly, when the amount of signal that is shifted by the delay time is referred to as "Ad" and the amounts of signal of the phase signals obtained at the timing when no pulse of reflected light enters is referred to as "DC", the distance value "d" in a basic form of TOF computation is expressed as in Formula (19) given below, and how Ad, Apulse, DC, To are determined is not limited.

$$d = (To + (Ad - DC)/(Apulse - DC) \times Tp) \times c/2 \quad (19)$$

When the magnification M of the distance measurable range is used on condition that M is less than N/(N−2) as in Formula (20) given below, the amount of signal Apulse of the phase signals does not exist depending on the distance conditions when all the pulses of reflected light are received. In a similar manner, the phase signal of the amount of signal DC does not exist depending on the distance conditions when no pulse of reflected light enters. In such cases, an alternative computing expression other than Formula (12) is to be used. However, a fundamental concept remains the same as Formula (19) as above.

$$1 \leq M < N/(N-2) \quad (20)$$

In the above configuration, Apulse and DC need to be obtained from computation using the phase signals. In FIG. 16, an example case where the magnifying power M of the distance measurable range in six-phase TOF computations is 2 is illustrated. Under these conditions, not only the phase signal with the maximum amount of signal, but also the order of size among all the phase signals needs to be determined. Note that N phase signals are obtained in N-phase TOF computation. In a similar manner to the above, A(i) denotes the amount of signal of the phase signal with the maximum amount of signal, and A(j) and A(k) denote the phase signals with the second largest amount of signal and the third largest amount of signal, respectively. Here, each of "j" and "k" indicates the amount of phase shift (°) of the phase signal, in a similar manner to "i". In Formula (21) and Formula (22) given below, Apulse and DC under the condition as above are referred to as Apulse' and DC', respectively.

$$Apulse' = N/2M \times (A(j) - A(k+180)) \quad (21)$$

$$DC' = A(i) + A(i+180) - N/2M \times (A(j) - A(k+180)) \quad (22)$$

Note that "Ad" and "To" are used in common with Formula (12) as above in the condition of Formula (20) as above. Accordingly, when the distance sensor 20 according to the present embodiment is used under the condition of Formula (20) as above, it is satisfactory as long as Formula (21) and Formula (22) as above are applied to Formula (12). As a result, Formula (23) is obtained as follows.

$$d=(To+(A(i+q)-DC')/A\text{pulse'})\times Tp))\times c/2 \qquad (23)$$

Formula (21) to Formula (23) as above are applicable to cases in which six-phase TOF computation is performed. When N-phase TOF computation is performed, "A(j)" and "A(k+180)" in Formula (21) and Formula (22) as above need to be determined by the order of size among the amounts of signal of the phase signals. Moreover, "A(j)" is to denote the phase signal with N/2-th largest amount of signal, and "A(k+180)" is to denote the phase signal with N/(2−1)-th smallest amount of signal. When N is an odd number, the digits to the right of the decimal point are dropped. Even when there are a plurality of phase signals whose amount of signal is equivalent to each other, the order of size of the phase signals is to be determined in some way.

As described above, the distance sensor 20 according to the present embodiment can be used not only according to the conditions in Formula (9) as above but also according to the conditions in Formula (20) as above. The selection as to which of the conditions in Formula (9) and the conditions in Formula (20) are to be applied to the TOF computation can be made based on the pulse width of a light-source driving signal (i.e., the pulse width of the irradiation light) and the pulse width of the acquisition time control signal (i.e., the period of time during which phase signals are obtained).

Figure 17:
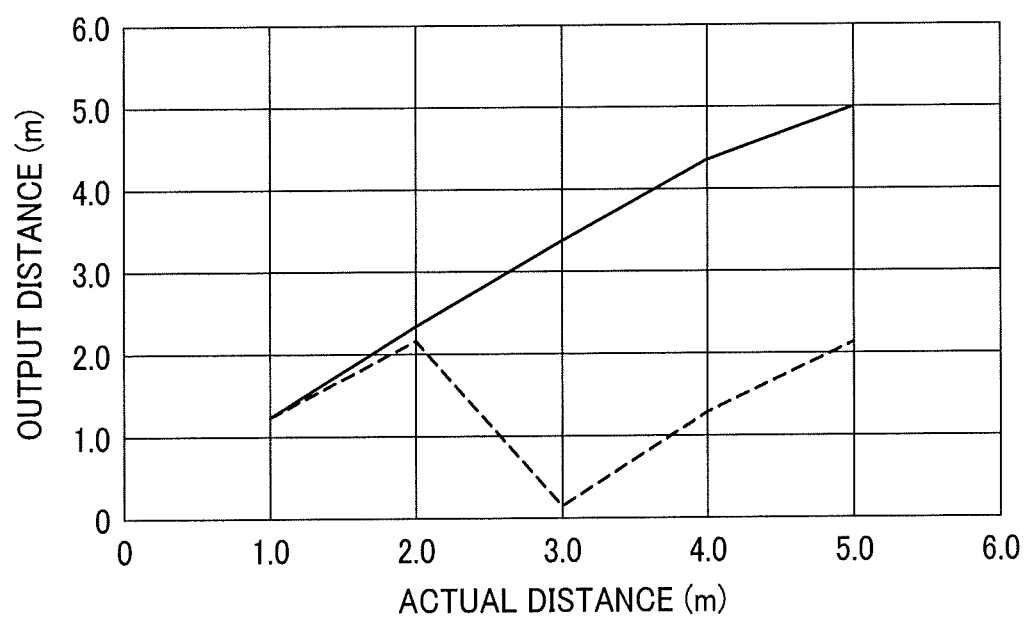
FIG. 17 is a diagram illustrating the relation between output distance and actual distance when a known TOF sensor and a distance sensor according to an embodiment of the present disclosure are used to measure distances, where only the pulse width of an acquisition time control signal is different from each other.

FIG. 17 is a diagram illustrating the result of measuring distances using the four-phase TOF computation by the known TOF sensors and the result of measuring distances using the four-phase TOF computation by the distance sensor 20 according to the present embodiment.

In these two kinds of four-phase TOF computation, the pulse width of the irradiation light is 10 ns, and the luminance level of light reception that is determined by the number of times the light source emits light and the light-emission intensity of the light source is made equivalent to each other.

When TOF computation is performed by the known TOF sensors, the pulse width of the acquisition time control signal, which is used for obtaining signals, is also 10 ns, and the duty ratio (pulse width/pulse cycle) is 50%. By contrast, when TOF computation is performed in the distance sensor 20 according to the present embodiment, the pulse width of the acquisition time control signal, which is used for obtaining signals, is 20 ns, and the duty ratio is 25%.

In the graph of FIG. 17, the horizontal axis indicates the actual distance [m] to the measured object, and the vertical axis indicates the output distance [m] obtained as a result of measuring the distance by the sensor. In the graph of FIG. 17, the broken lines indicate the result of distance measurement performed by the known TOF sensors, and the solid line indicates the result of distance measurement performed by the distance sensor 20 according to the present embodiment.

The distance measurable range of known TOF sensors is determined by the pulse width of a light-source driving signal. In the present embodiment, the distance measurable range of the TOF sensor is 3.0 m. For this reason, aliasing occurs in the measurement result for an area at a long distance further than 3.0 m, and the output distance becomes repetitive. By contrast, the distance measurable range of the distance sensor 20 according to the present embodiment can be expanded twice as much as the known TOF sensors. Accordingly, the distance can be measured even when an object is at a long distance longer than 3.0 m.

Figure 18:
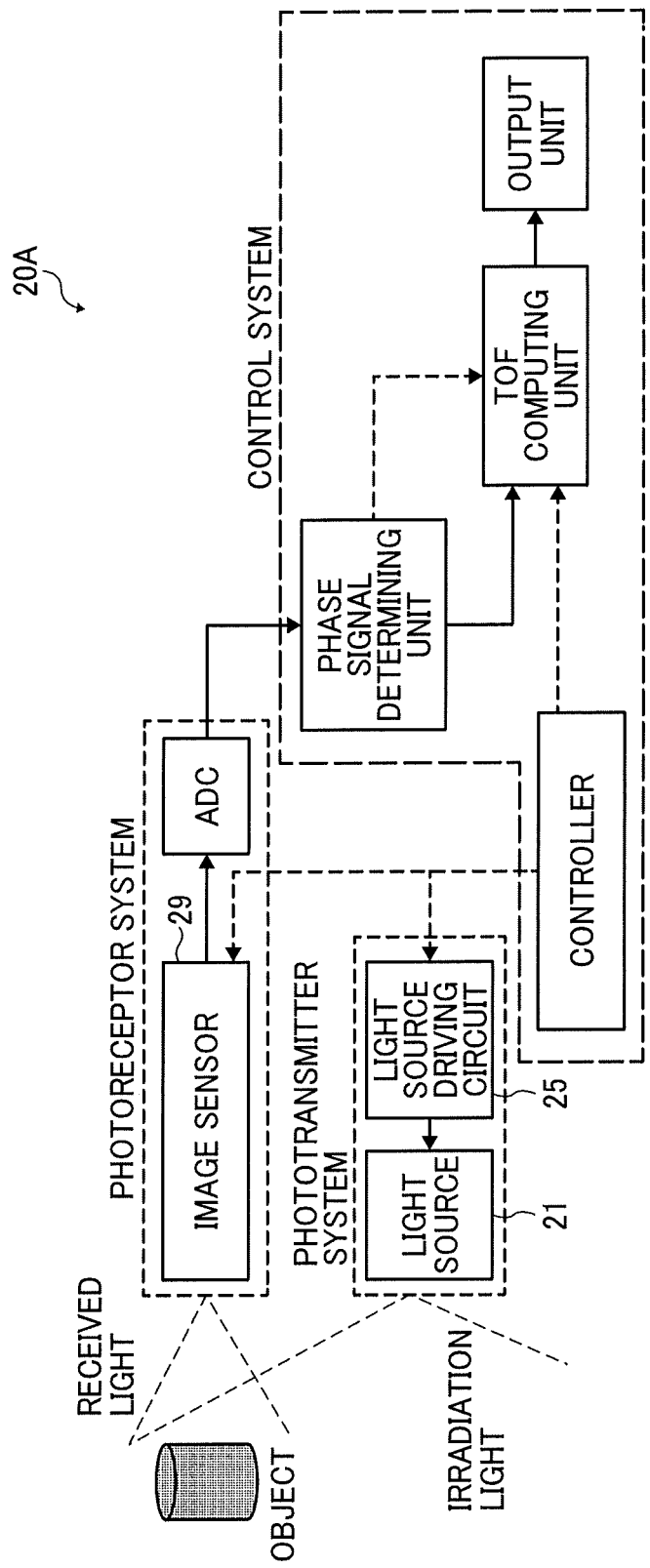
FIG. 18 is a diagram illustrating a distance sensor according to the first example of an embodiment of the present disclosure.

FIG. 18 is a diagram illustrating a configuration of a distance sensor 20A according to the first example of the distance sensor 20 of the present embodiment.

As illustrated in FIG. 18, the distance sensor 20A according to the first example has a phase signal determining unit in addition to the light source 21, the light source driving circuit 25, the image sensor (imaging element) 29, the analog-digital converter (ADC), the controller, the time-of-flight (TOF) computing unit, and the output unit, which are in common with the known first and second TOF sensors as above. These elements of the distance sensor 20A are electrically connected to each other through a bus through which data can be transmitted. In the distance sensor 20A, the operations of the light source 21, the light source driving circuit 25, the image sensor 29, the ADC, the controller, the TOF computing unit, and the output unit are similar to those of the known TOF sensors. The multiple phase signals that are obtained by the image sensor 29 are sent to the phase signal determining unit through the ADC. The phase signal determining unit makes a determination on the phase signals. The term "make a determination on the phase signals" indicates determining the order of size among the amounts of signal of the multiple phase signals, i.e., comparing the amounts of signal of the multiple phase signals with each other and outputting the results of the comparison.

Figure 19:
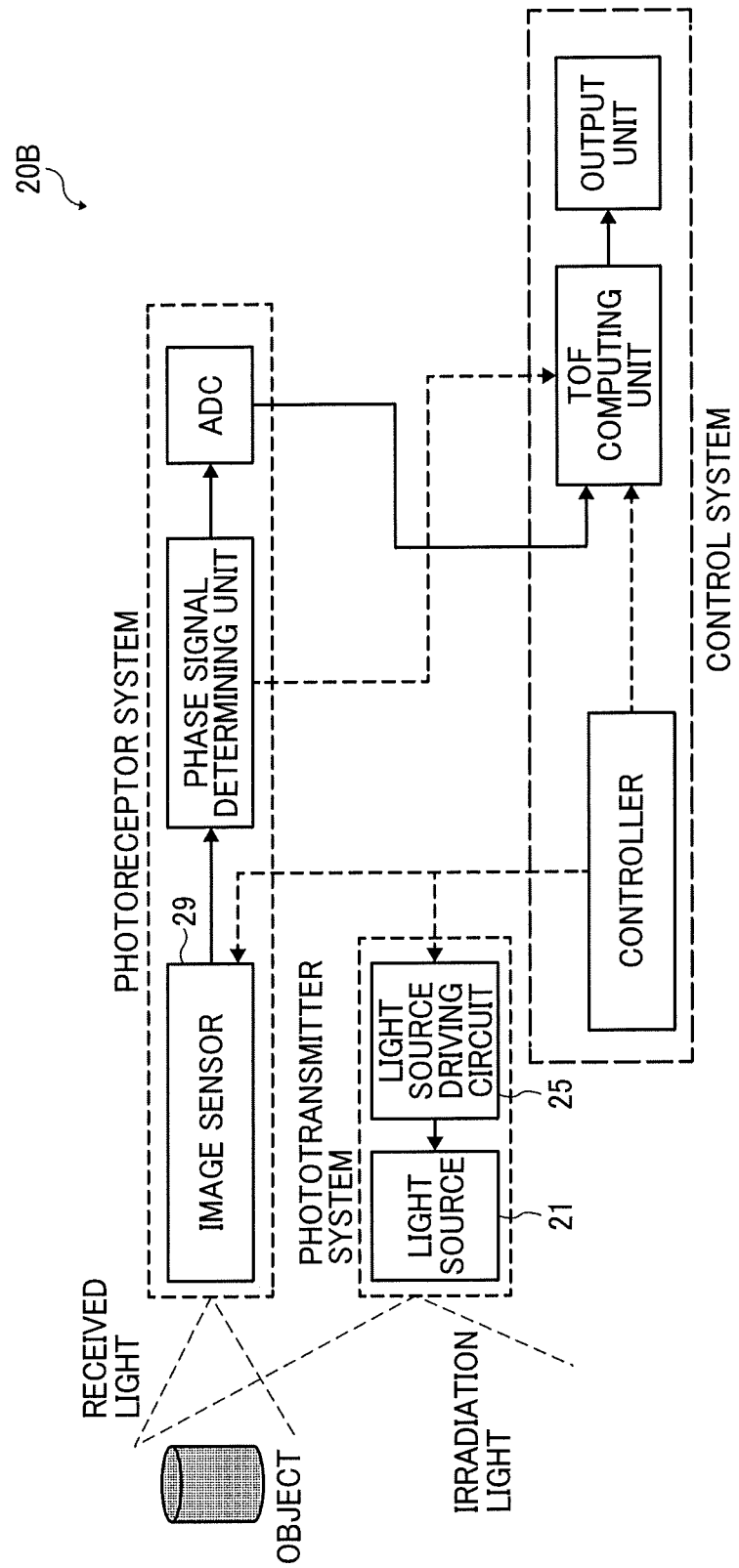
FIG. 19 is a diagram illustrating a distance sensor according to the second example of an embodiment of the present disclosure.

FIG. 19 is a diagram illustrating a configuration of a distance sensor 20B according to the second example of the distance sensor 20 of the present embodiment.

As illustrated in FIG. 19, the distance sensor 20 according to the second example is different from the distance sensor 20A according to the first example in that determination on the phase signals is performed for the output signals (analog signals) that have not gone through analog-to-digital (A/D) conversion after being output from the imaging element.

Due to such a configuration, as illustrated in FIG. 19, the phase signal determining unit of the distance sensor 20B is connected between the imaging element and the ADC in the photoreceptor system.

In a similar manner to the first and second known TOF sensors illustrated in FIG. 9A and FIG. 9B, respectively, no limitation is intended regarding whether or not the elements of the distance sensors 20A and 20B according to the first example and the second example, respectively, are integrated or a part of the system that includes external hardware.

Figure 20A:
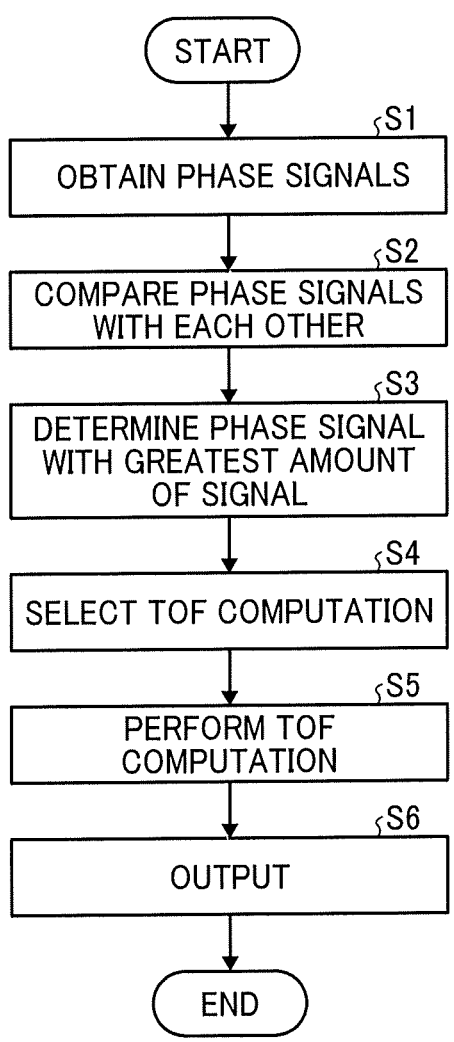
FIG. 20A and FIG. 20B are flowcharts of the first and second operation flows of a distance sensor according to an embodiment of the present disclosure.
Figure 20B:
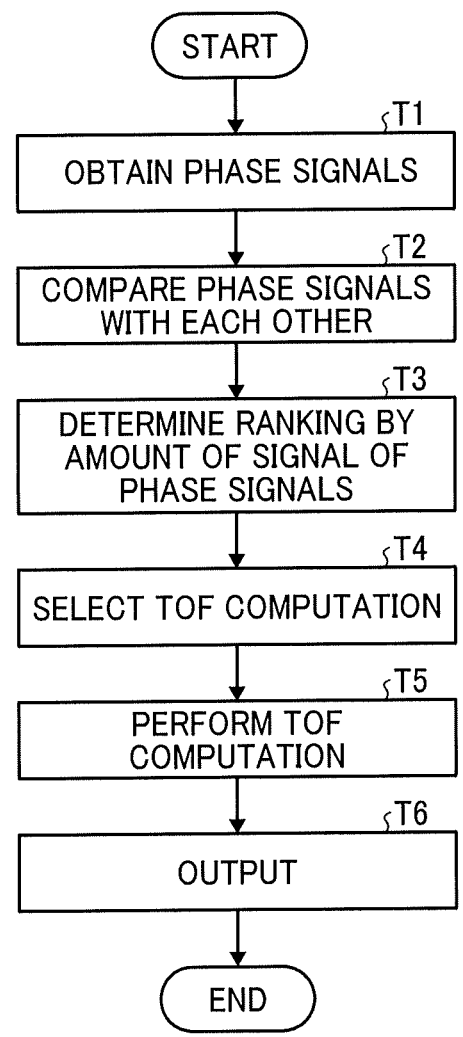

FIG. 20A and FIG. 20B are flowcharts of the first and second operation flows of the distance sensor 20 (i.e., the distance sensors 20A and 20B according to the first example and the second example, respectively) according to the present embodiment.

FIG. 20A depicts cases in which M is defined according to the conditions in Formula (9) as above only, and FIG. 20B depicts cases in which M is defined according to the conditions in Formula (20) as above in addition to the conditions in Formula (9) as above.

Firstly, the first operation flow as depicted in FIG. 20A is described below.

In the first step S1, a plurality of phase signals that are used to measure distances are obtained. This operation is performed by the image sensor 29 as illustrated in FIG. 18 and FIG. 19, and the obtained multiple phase signals are sent to the phase signal determining unit illustrated in FIG. 18 and FIG. 19.

In the next step S2, the phase signal determining unit compares the amounts of signal of the obtained multiple phase signals with each other.

In the next step S3, the phase signal determining unit determines the phase signal with the greatest amount of signal among the obtained multiple phase signals, based on the results of the comparison in the step S2.

In the next step S4, a TOF computation method is selected. More specifically, the pulse width Tv of the acquisition time control signal is set with reference to the predetermined pulse width Tp of the pulse of irradiation light, and either one of the TOF computation under the condition of Formula (9) as above and the TOF computation under the condition of Formula (20) as above is selected depending on the value of M(=Tv/Tp) obtained in Formula (11) as above. For example, when it is determined that the amount of received light is sufficient and it is unlikely that aliasing occurs according to the amounts of signal of the obtained multiple phase signals, the TOF computation under the condition of Formula (20) as above may be performed upon reducing the value of M. On the other hand, when it is determined that the amount of received light is insufficient and it is highly likely that likely that aliasing occurs according to the amounts of signal of the obtained multiple phase signals, the TOF computation under the condition of Formula (9) as above may be performed upon increasing the value of M. Note also that the speed of the computation can be enhanced when the value of M is reduced, and the distance measurable range can be expanded when the value of M is increased.

In the subsequent step S5, unique TOF computation (i.e., the TOF computation selected in the step S4) is performed using the obtained multiple phase signals. This operation is performed by the TOF computing unit as illustrated in FIG. 18 and FIG. 19.

In the last step S6, the result of TOF computation is sent from the TOF computing unit to the output unit as illustrated in FIG. 18 and FIG. 19, and the result of TOF computation is output in a format adapted to the output format.

Between the first operation flow as depicted in FIG. 20A and the second operation flow as depicted in FIG. 20B, the steps S1, S2, S4, and S5 are equivalent to the steps T1, T2, T4, and T5, and the step S3 and the step T3, which are performed by the phase signal determining unit, are different from each other.

Here, the second operation flow as depicted in FIG. 20B is briefly described. Firstly, the image sensor 29 obtains a plurality of phase signals that are used to measure distances (step T1). Then, the obtained multiple phase signals are sent to the phase signal determining unit. The phase signal determining unit compares the amounts of signal of the obtained multiple phase signals with each other (step T2), and the order of size among the amounts of signal of the multiple phase signals is determined (step T3). After a step T4 in which the TOF computation method is selected, the obtained multiple phase signals and the order of size among the amounts of signal of the phase signals are sent to the TOF computing unit, and both are used to perform unique TOF computation (step T5). Finally, the result of TOF computation is sent to the output unit as illustrated in FIG. 18 and FIG. 19, and the result of TOF computation is output in a format adapted to the output format (step T6).

Note that the step S4 in FIG. 20A or the step T4 in FIG. 20B may be omitted. In other words, only one TOF computation method may be set in advance. For example, when a higher priority is given to the speed-enhancement of computation, the TOF computation under the condition of Formula (20) as above may be performed upon reducing the value of M. Alternatively, when a higher priority is given to the expansion of the distance measurable range, the TOF computation under the condition of Formula (9) as above may be performed upon increasing the value of M.

Figure 21A:
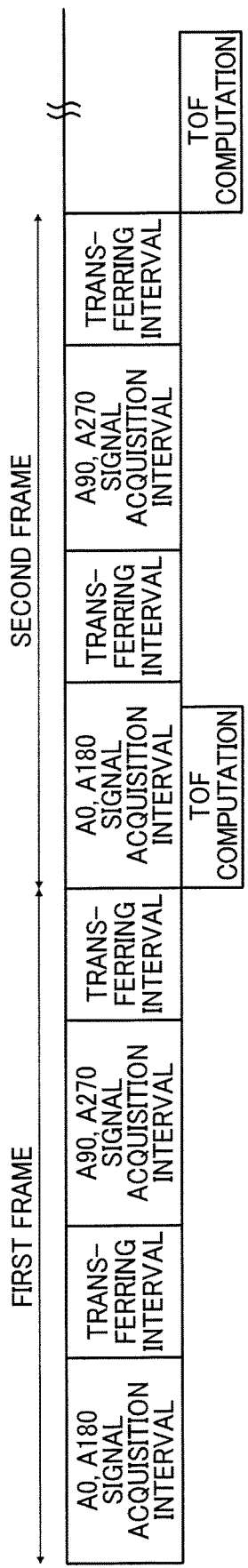
FIG. 21A is a diagram illustrating an example frame configuration of a known four-phase TOF sensor.
Figure 21B:
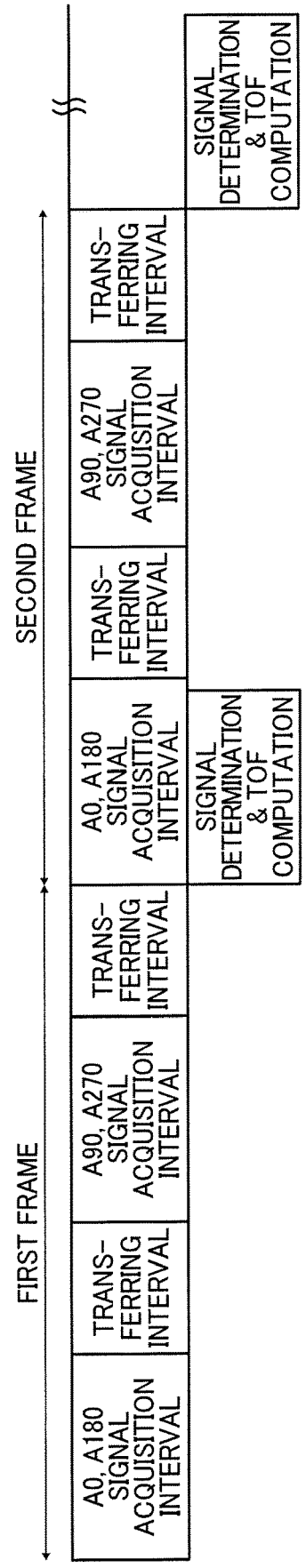
FIG. 21B is a diagram illustrating an example frame configuration of a four-phase distance sensor according to an embodiment of the present disclosure.

FIG. 21A and FIG. 21B are diagrams to perform comparison between an example frame configuration of a known four-phase TOF sensor and an example frame configuration of the distance sensor 20 according to the present embodiment.

FIG. 21A is a diagram illustrating an example frame configuration of a known four-phase TOF sensor. As illustrated in FIG. 21A, in the known TOF sensors, the length of time of one frame between the instant when light reception starts and the instant when a distance value is output is determined by the interval during which the imaging element obtains phase signals (signal acquisition interval) and the interval during which the data is being transferred.

FIG. 21B is a diagram illustrating an example frame configuration of the four-phase distance sensor 20 according to the present embodiment. As illustrated in FIG. 21B, in the distance sensor 20, the length of time of the signal acquisition interval and the transferring interval are no different from those of the known TOF sensors.

As illustrated in FIG. 21B, differences between the distance sensor 20 according to the present embodiment and the known TOF sensors are in that the order of size is determined among the phase signals and the TOF computation is performed according to the result of determination after the transferring interval, in parallel with the next signal acquisition interval.

The basic frame configuration of the distance sensor 20 according to the present embodiment is no different from that of the known TOF sensors, and thus the distance sensor 20 according to the present embodiment may be used without compromising the frame rate while maintaining the speediness of the TOF method. When the frame interval of the distance sensor 20 is made equal to that of the known TOF sensors, the light emitting period of the distance sensor 20 is reduced by one-half compared with the known TOF sensors. However, when the quantity of light is sufficient, the modulation frequency has a greater impact on the accuracy of distance measurement than the quantity of light. For this reason, the distance sensor 20 is advantageous to the known TOF sensors.

Figure 22:
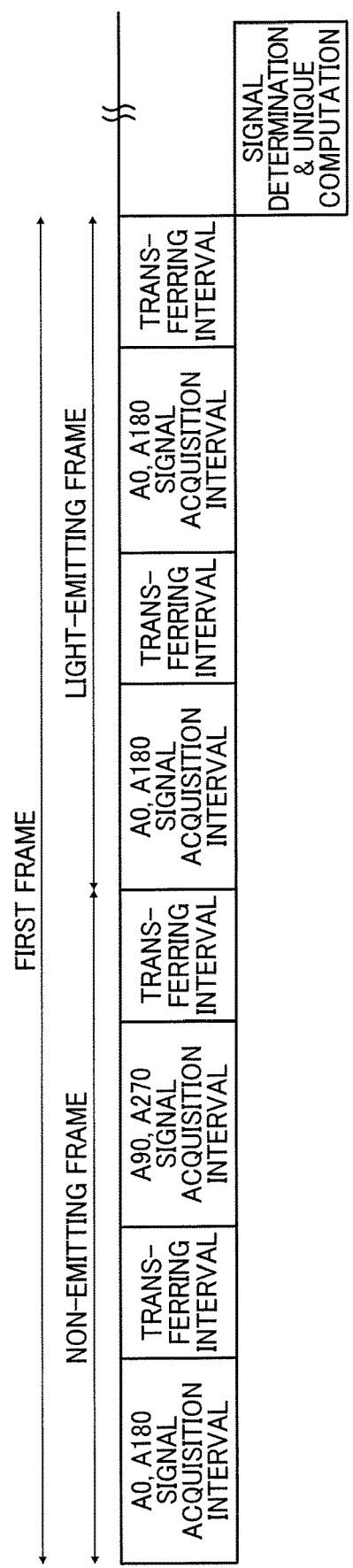
FIG. 22 is a diagram illustrating an example frame configuration where a light-emitting frame and a non-emitting frame are included in a single frame of a distance sensor, according to an embodiment of the present disclosure.

FIG. 22 is a diagram illustrating an example frame configuration in which one frame of the distance sensor 20 according to the present embodiment is composed of a light-emitting frame where the light source 21 is controlled to emit light and a non-emitting frame where the light source 21 is controlled not to emit light in order to obtain an offset component of signal, according to the present embodiment.

As long as an offset component of signal is successfully obtained in the non-emitting frame, DC' can be obtained from the obtained signals even when the distance sensor 20 is used under the condition of Formula (20) as above. Accordingly, the TOF computation can be simplified as in Formula (24) given below.

$$d=(T_0+(A(i+q)-DC')/(A(i)+A(i+180)-2DC')\times T_p))\times c/2 \qquad (24)$$

The Formula (24) as above is a common formula applicable to either one of the conditions of Formula (9) or Formula (20) as above. Accordingly, no change occurs to the TOF computation depending on the set M, and the load on the integrated circuit (IC) of the distance sensor 20 is reduced. Moreover, an offset component of signal can always be obtained even under the condition of Formula (20) as above, and thus the disturbance light resistance improves.

When an area at short distance where no aliasing occurs is to be measured, in the distance sensor 20 according to the present embodiment, the duty ratio needs to be equal to or less than 25%. For this reason, the known TOF sensors are advantageous in light quantity and speediness.

Accordingly, when the TOF sensor according to the present embodiment is used and when the result of computation performed on a certain frame by the TOF computing unit indicates distance measurable range smaller than the distance measurable range of known TOF sensors that is calculated from the pulse width of the irradiation light, the duty ratio of the pulse width of the acquisition time control signal in the subsequent frames can be made to 50% in accordance with the pulse width of the irradiation light.

Figure 23A:
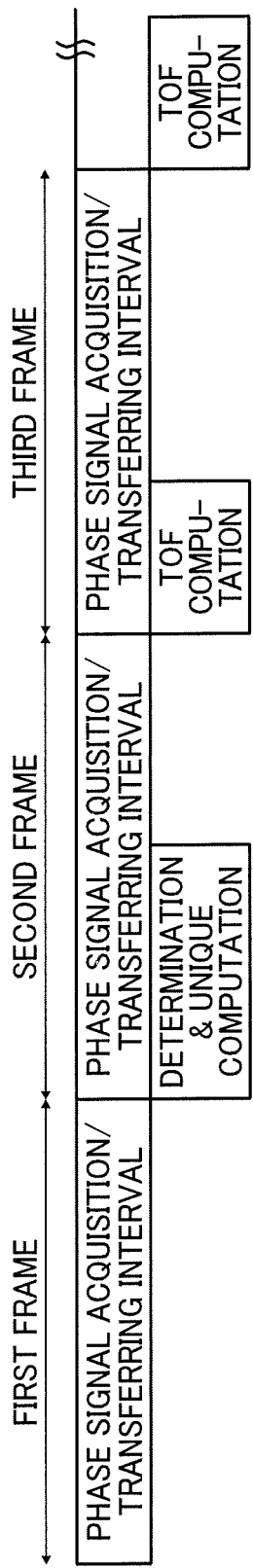
FIG. 23A is a diagram illustrating an example frame configuration aimed at improving the accuracy of distance measurement, according to an embodiment of the present disclosure.

FIG. 23A is a diagram illustrating an example frame configuration aimed at improving the accuracy of distance measurement in the configuration as above, according to the present embodiment.

Figure 23B:
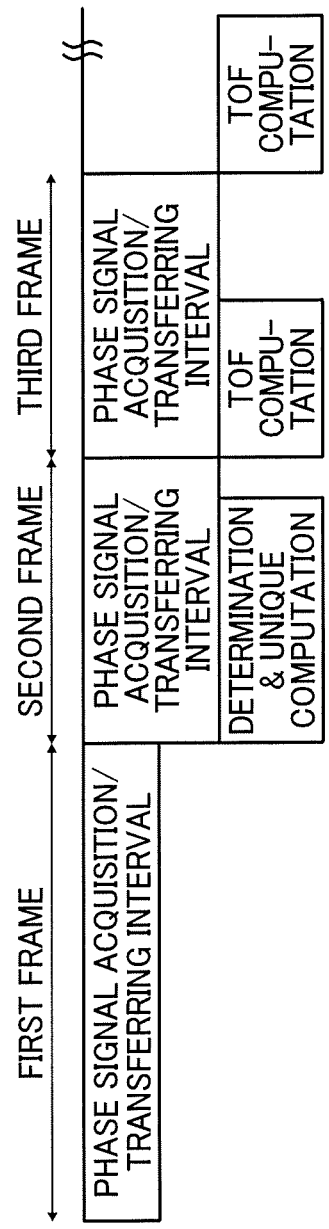
FIG. 23B is a diagram illustrating an example frame configuration aimed at enhancing the speed of distance measurement, according to an embodiment of the present disclosure.

FIG. 23B is a diagram illustrating an example frame configuration aimed at enhancing the speed of distance measurement in the configuration as above, according to the present embodiment.

Figure 24:
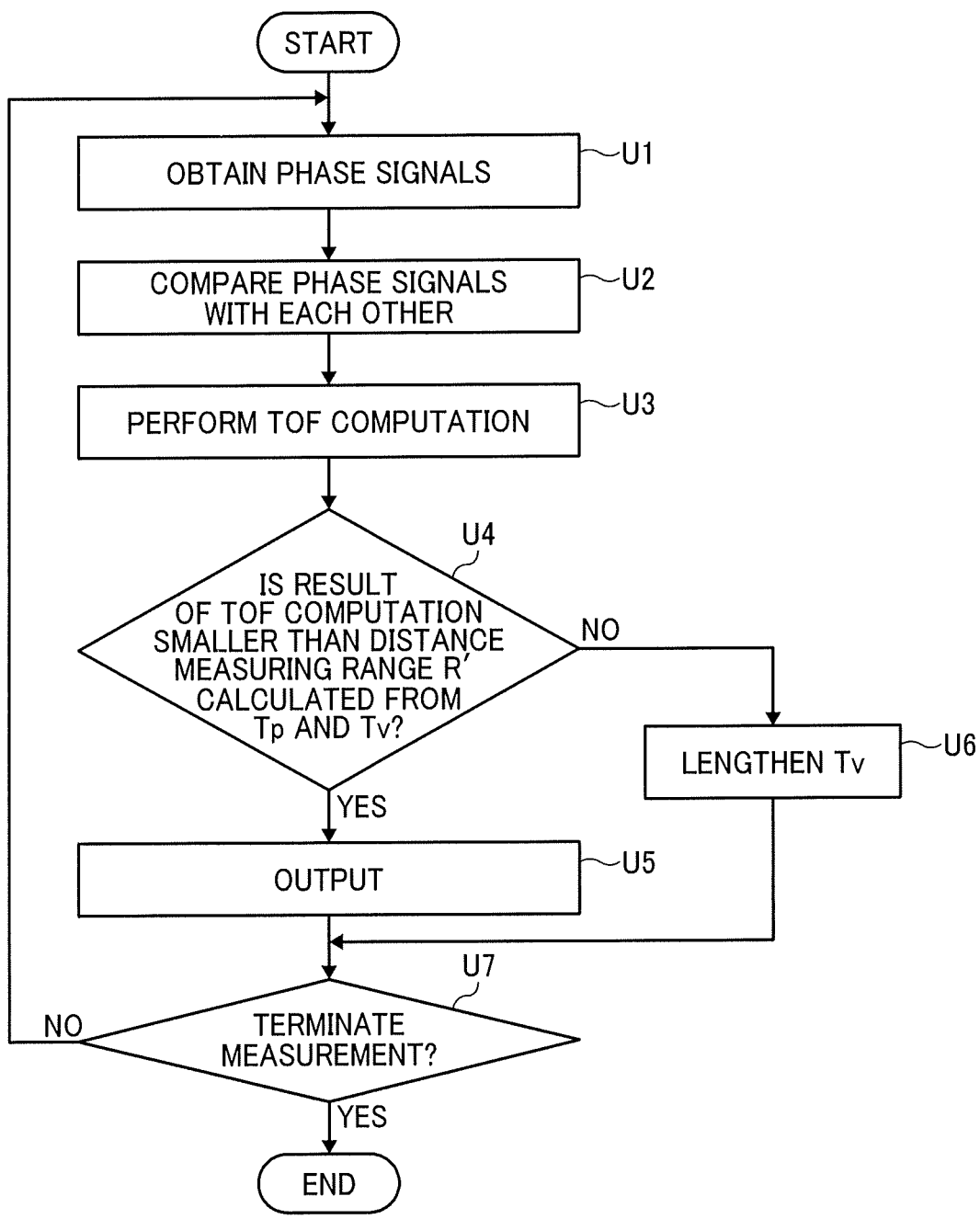
FIG. 24 is a flowchart of the third operation flow of a distance sensor according to an embodiment of the present disclosure.

FIG. 24 is a flowchart of the third operation flow of the distance sensor 20, including the processes of determining whether aliasing is present, according to the present embodiment.

Steps U1, U2, and U3 in the third operation flow as depicted in FIG. 24 are equivalent to the steps S1, S2, and S5 in the first operation flow as depicted in FIG. 20A, respectively. For this reason, the steps unique to the third operation flow are described below.

Figure 25:
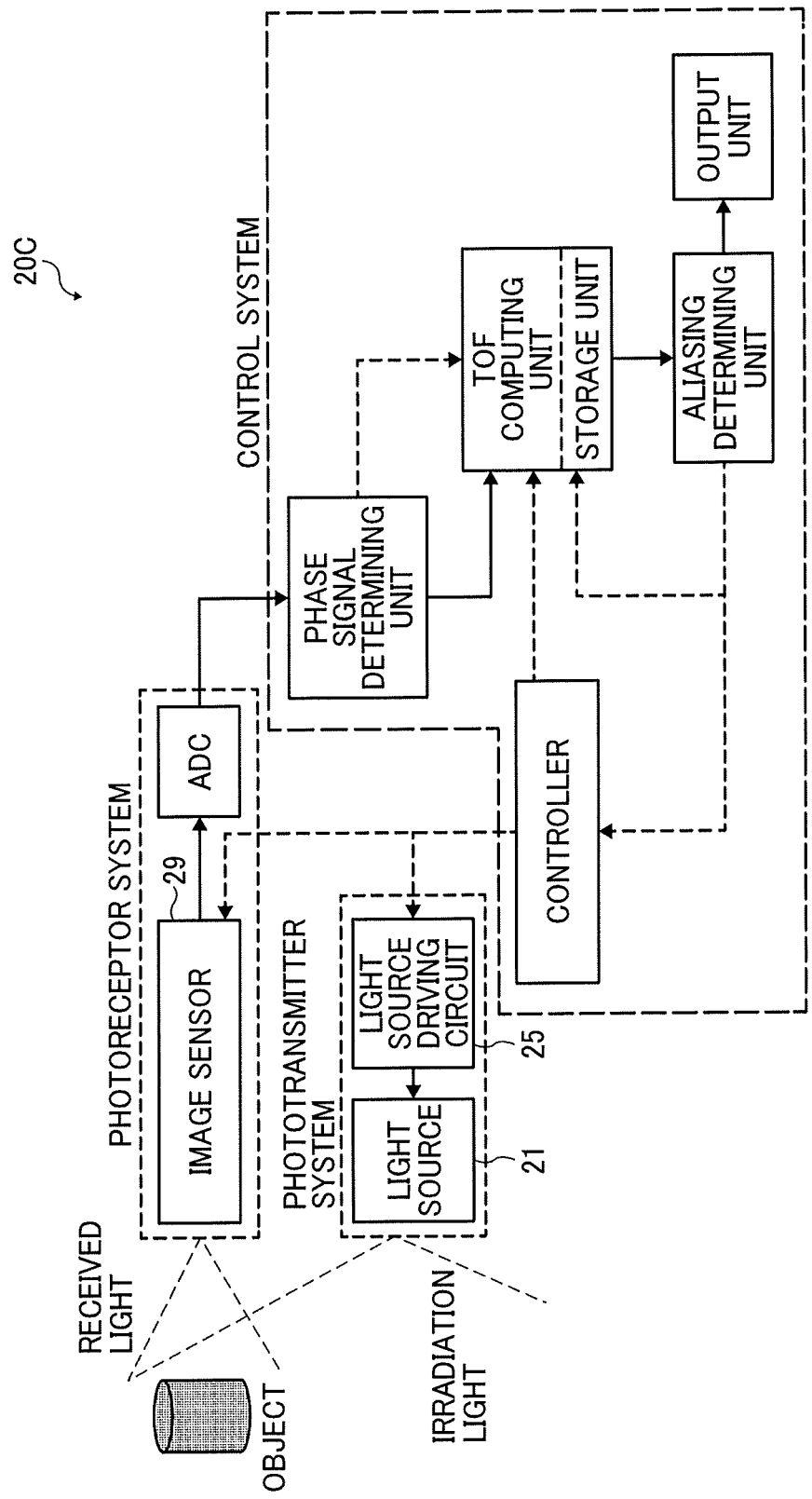
FIG. 25 is a diagram illustrating a distance sensor according to the third example of an embodiment of the present disclosure.

FIG. 25 is a diagram illustrating a distance sensor 20C according to the third example of an embodiment of the present disclosure.

Figure 26:
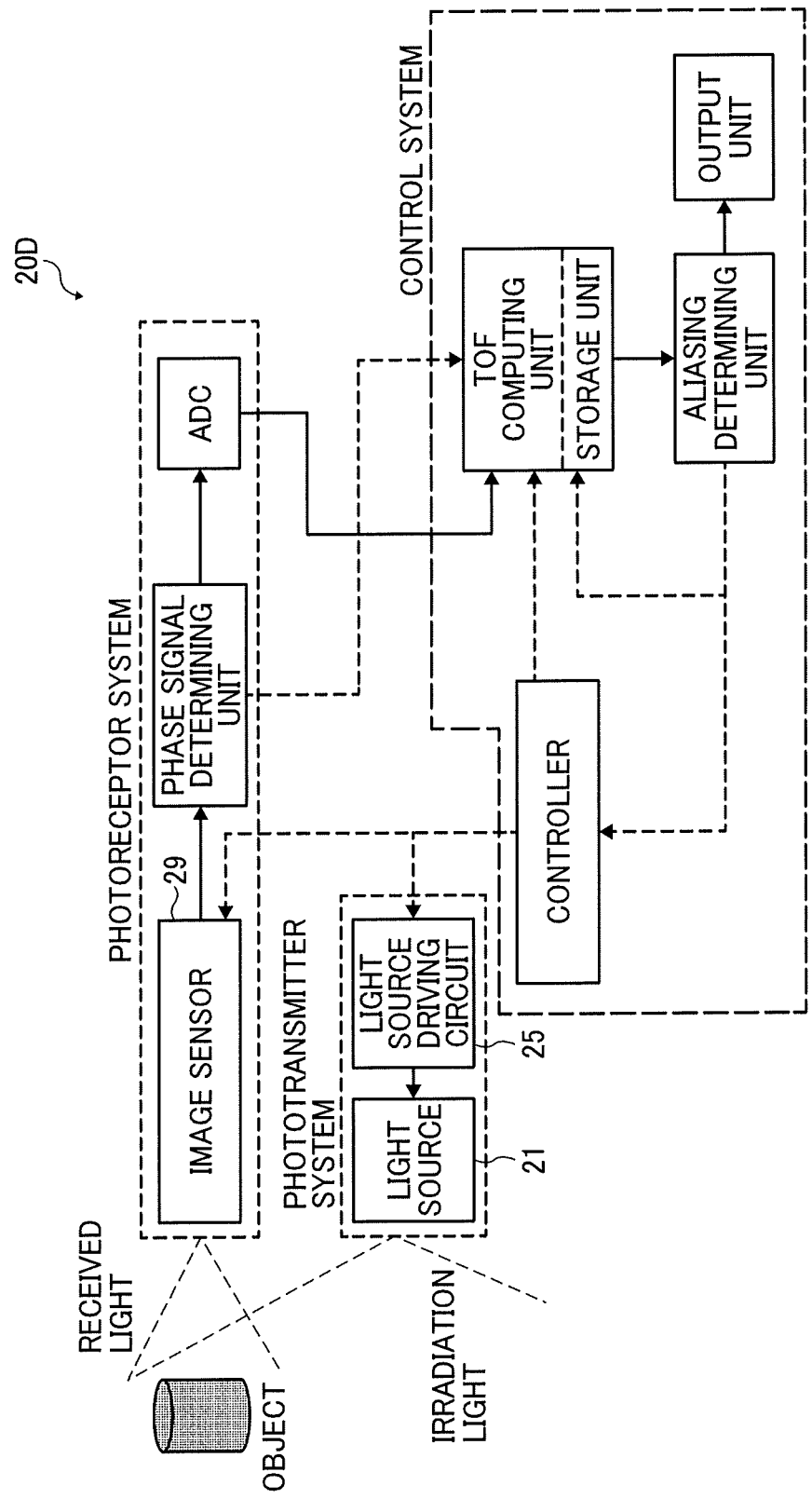
FIG. 26 is a diagram illustrating a distance sensor according to the fourth example of an embodiment of the present disclosure.
Figure 27:
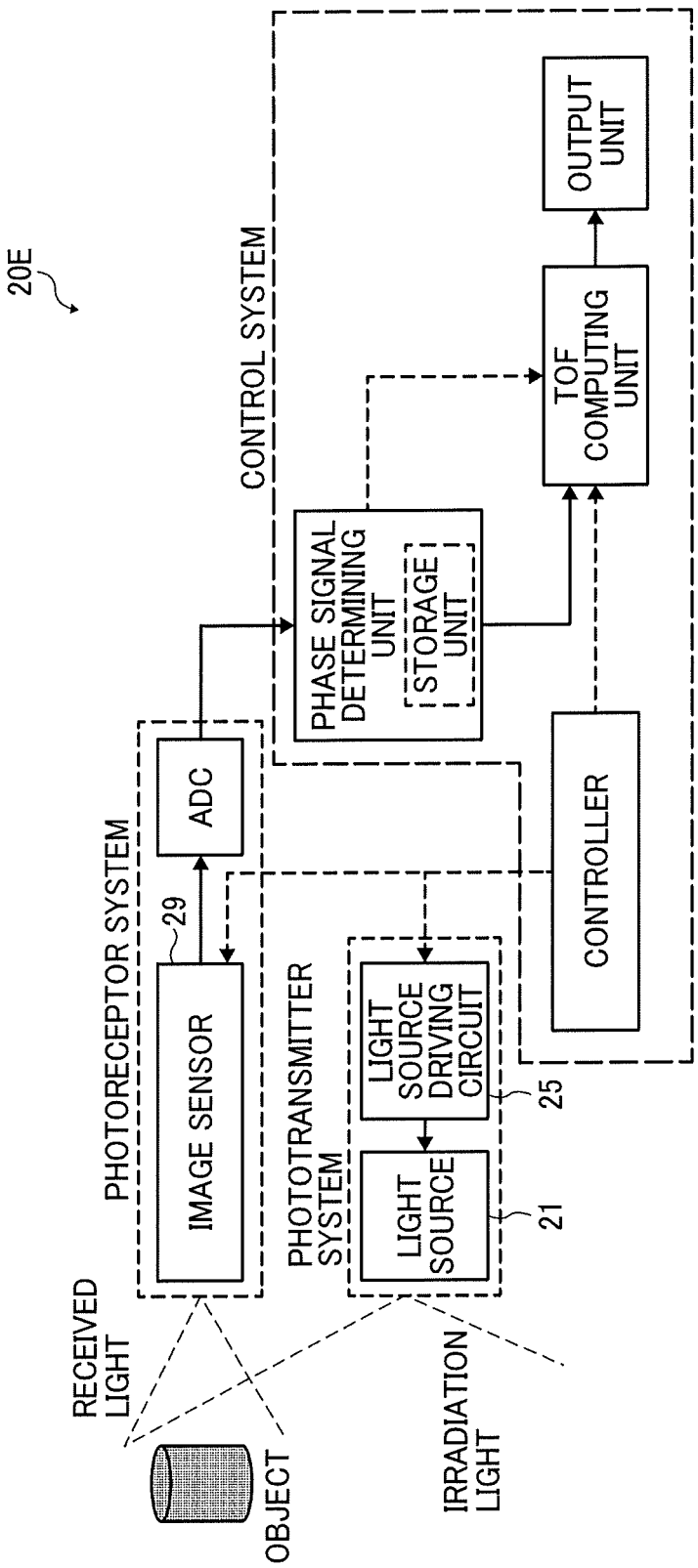
FIG. 27 is a diagram illustrating a distance sensor according to the fifth example of an embodiment of the present disclosure.
Figure 28:
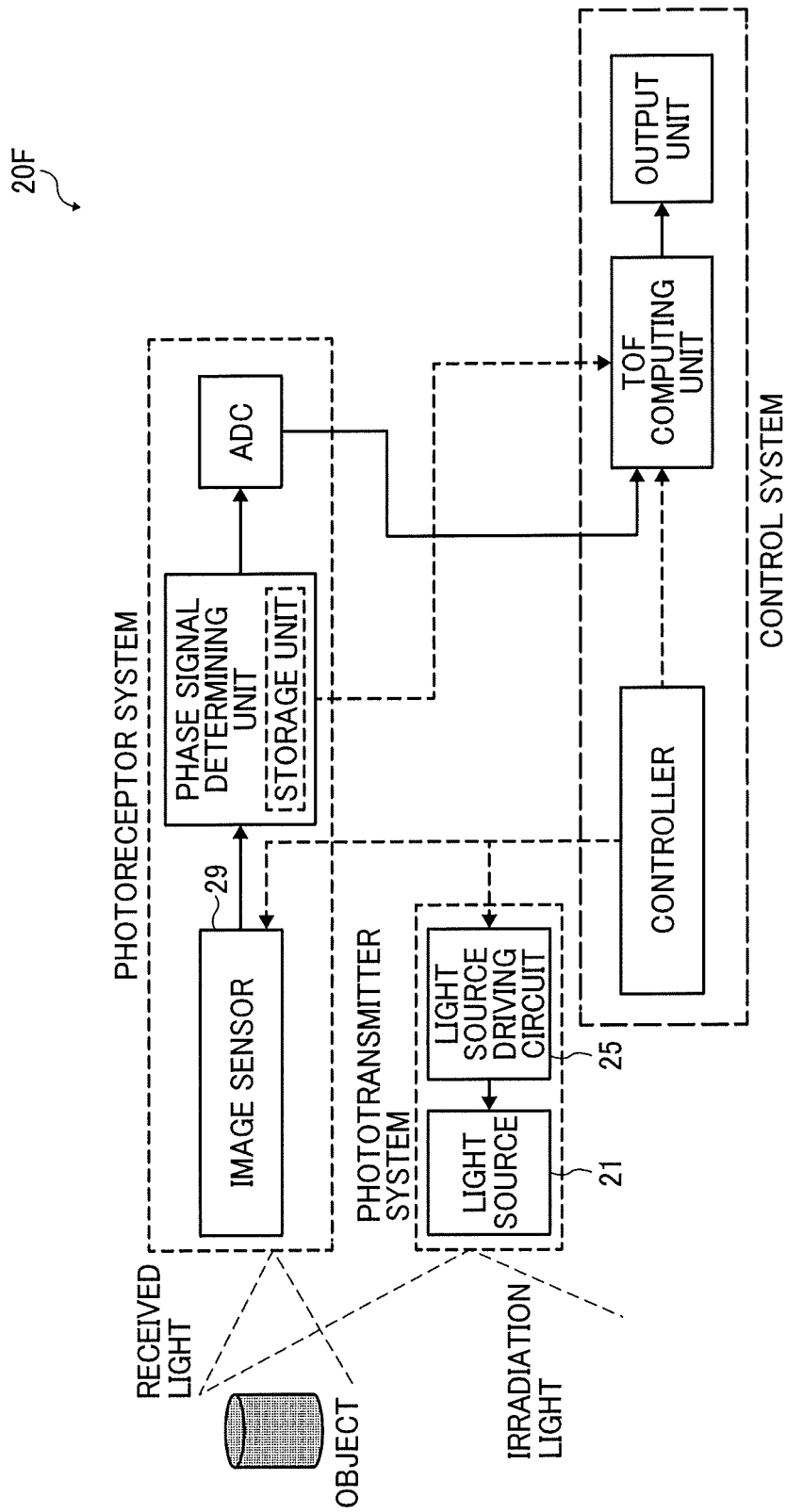
FIG. 28 is a diagram illustrating a distance sensor according to the sixth example of an embodiment of the present disclosure.
Figure 29:
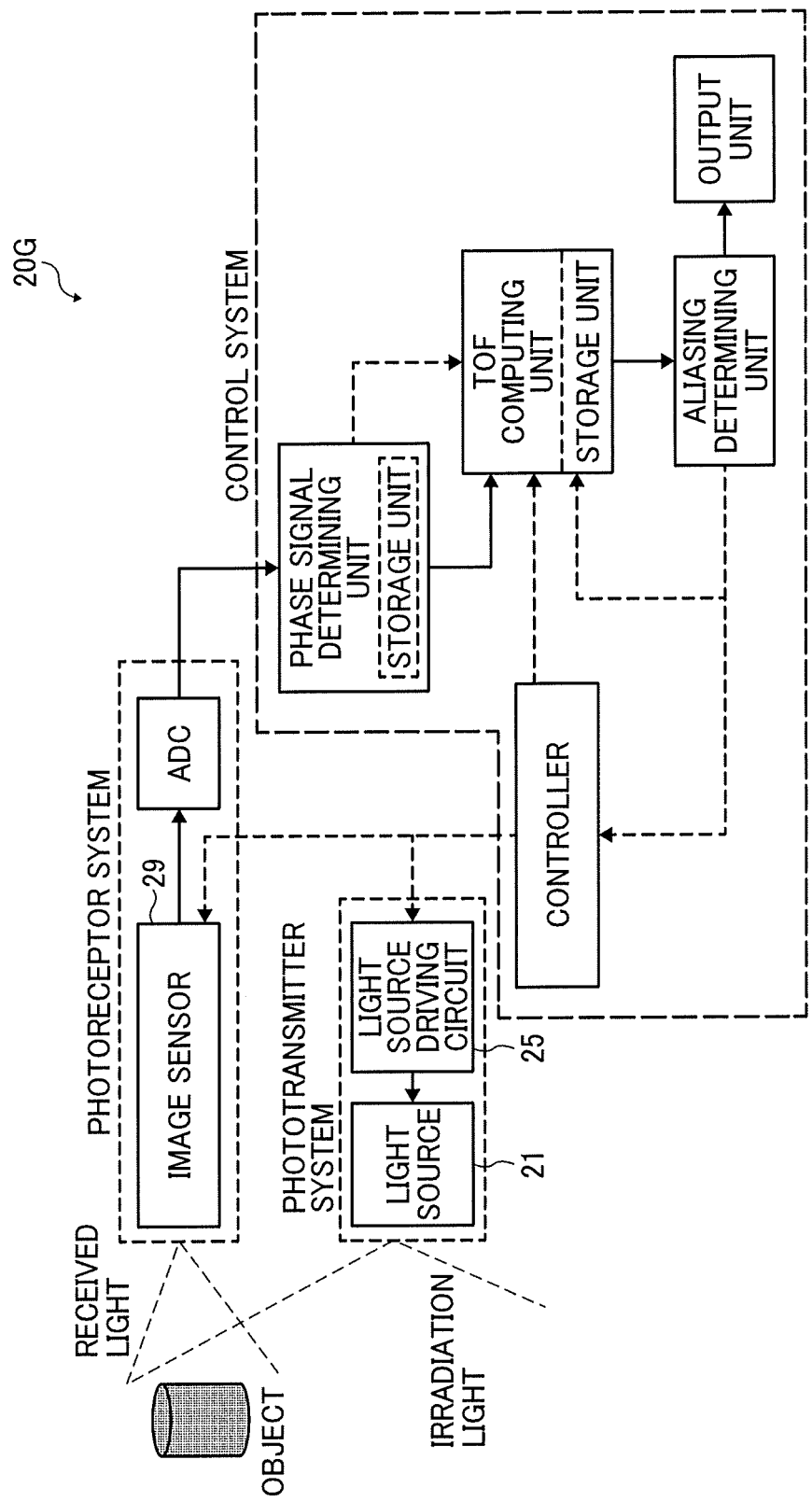
FIG. 29 is a diagram illustrating a distance sensor according to the seventh example of an embodiment of the present disclosure.
Figure 30:
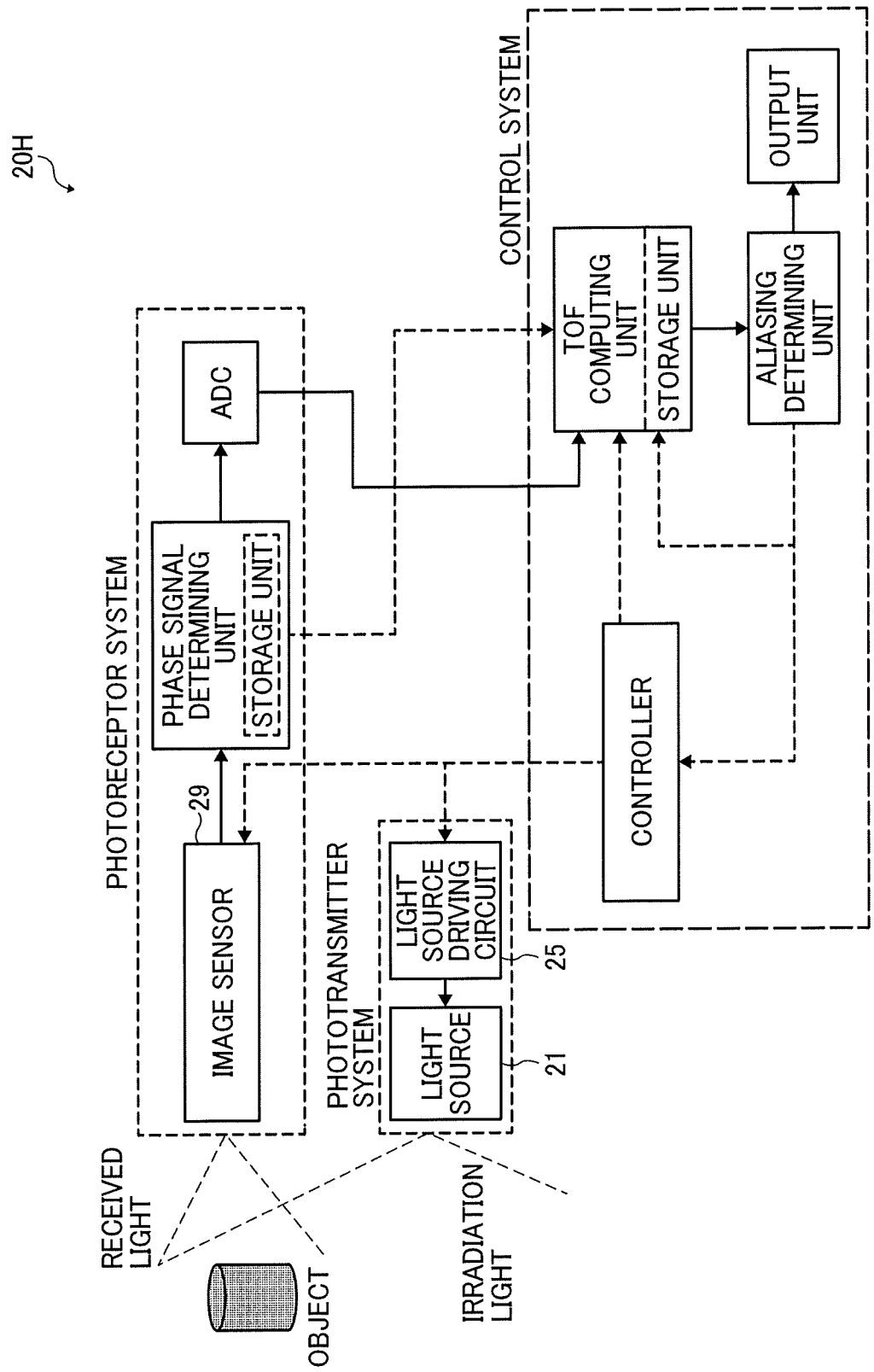
FIG. 30 is a diagram illustrating a distance sensor according to the eighth example of an embodiment of the present disclosure.

FIG. 26 is a diagram illustrating a distance sensor 20D according to the fourth example of an embodiment of the present disclosure.

In order to implement the third operation flow, an aliasing determining unit needs to be provided in addition to the distance sensors 20A and 20B illustrated in FIG. 18 and FIG. 19 according to the first example and the second example, respectively, as in the distance sensor 20C and the distance sensor 20D as illustrated in FIG. 25 and FIG. 26, respectively, according to the third and fourth examples of the distance sensor 20 according to the present embodiment.

Preparatory to the execution of the third operation flow, the pulse width Tp of the irradiation light and the pulse width Tv of the acquisition time control signal are initialized to meet "M(Tv/Tp)≥1". The third operation flow starts when the distance sensor 20 receives a request to start measurement sent from the main controller 80.

The aliasing determining unit receives the pulse width Tp of the irradiation light and the pulse width Tv of the acquisition time control signal from the controller, and receives the distance value d, which is the result of TOF computation, from the TOF computing unit. Accordingly, the aliasing determining unit can determine which of the distance value d and the distance measurable range R' of the distance sensor 20 is greater than the other.

Accordingly, in a step U4, whether the distance value d (i.e., the result of TOF computation) is smaller than distance measuring range R' is determined. In other words, the aliasing determining unit determines whether or not aliasing is present. When d is smaller than R' ("YES" in the step U4), the aliasing determining unit determines that no aliasing is present, and the output unit outputs distance value d in a format adapted to the output format (step U5).

By contrast, when d is equal to or greater than R' ("NO" in the step U4), the aliasing determining unit determines that aliasing is present, and the controller lengthens Tv to increase R' in the next frame (step U6). In so doing, it is desired that Tv be changed such that R' in the next frame will be at least greater than the distance value d in the current frame.

When the measurement is to be terminated (i.e., when the distance sensor 20 receives a request to terminate measurement sent from the main controller 80), the flow is terminated ("YES" in a step U7). When the measurement is to be continued, the flow returns to the step U1 ("NO" in the step U7) and phase signals are obtained in the next frame.

In place of lengthening Tv or in addition to lengthening Tv in the step U6, Tp may be lengthened such that R' in the next frame will increase (preferably, such that R' in the next frame will be at least greater than the distance value d in the current frame).

With the aliasing determining unit, whether or not aliasing is present can be determined in real time (for example, on a frame-by-frame basis). Accordingly, when the distance measurable range R' in the distance sensor 20 according to the present embodiment can afford reduction ("YES" in the step U4), Tp or Tv may be adjusted to meet the distance value d, which is the result of TOF computation, to adjust the magnification M (Tv/Tp) of the distance measurable range among frames.

In the distance sensor 20 according to the present embodiment, the number of times the light source 21 is to emit light can be optimized according to the results of the comparison made by the phase signal determining unit among the multiple phase signals obtained in a certain frame. For example, the amount of signal of the obtained phase signal with the maximum amount of signal is compared with the capacity of signal on a pixel-by-pixel basis determined by the storage capacity of the charge storage unit and the level of the light-receptive sensitivity of the light receiver, and when the capacity of signal has sufficient room, the number of times the light source 21 is to emit light can be increased.

If one frame is composed of a light-emitting frame and a non-emitting frame in the distance sensor 20 according to the present embodiment and the amount of signal Apulse of the phase signals when all the pulses of reflected light are received and the amount of signal DC of the phase signal when no pulse of reflected light enters are obtained, the S/N ratio of the measurement can be obtained from Apulse and DC. Accordingly, the number of times the light source 21 is to emit light can be changed based on the obtained S/N ratio.

In other words, in the distance sensor 20 according to the present embodiment, the number of times the light source 21 is to emit light in a frame at a later time can be optimized based on at least one of the S/N ratio and the capacity of signal on a pixel-by-pixel basis, each of which is obtained from the amounts of signal of the multiple phase signals obtained in a certain frame. In this configuration, as in the distance sensor 20E, the distance sensor 20F, the distance sensor 20G, and the distance sensor 20H as illustrated in FIG. 27 to FIG. 30, respectively, according to the fifth to eighth examples of the distance sensor 20 according to the present embodiment, a storage unit (for example, a memory or hard disk (HD)) that stores a threshold for the amount of signal of phase signals needs to be provided inside the phase signal determining unit.

Figure 31:
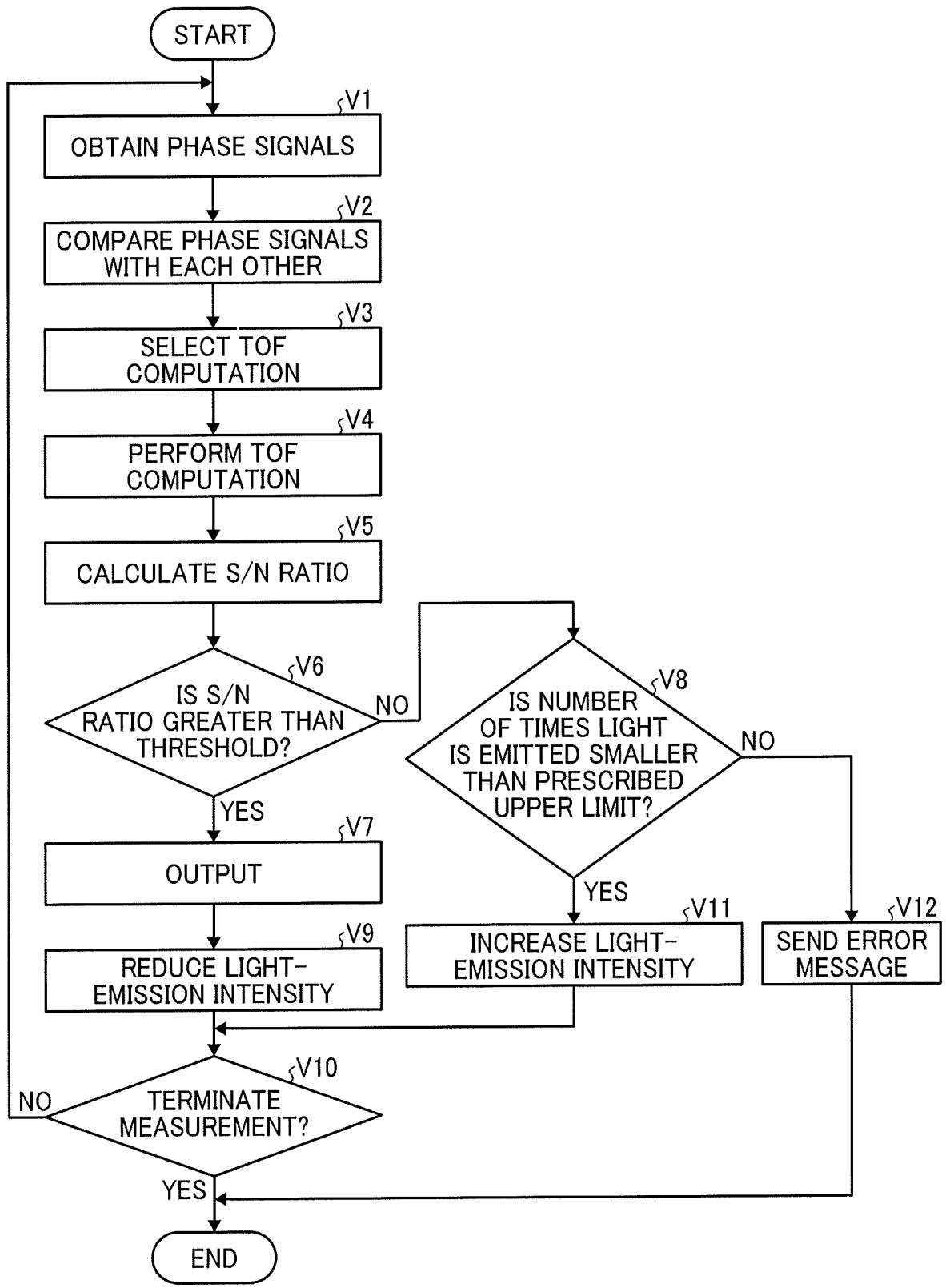
FIG. 31 is a flowchart of the fourth operation flow of a distance sensor according to an embodiment of the present disclosure.

FIG. 31 is a diagram illustrating the fourth operation flow when the light-emission intensity of the light source 21 is adjusted according to the S/N ratio in the distance sensor 20 according to the present embodiment. Preparatory to the execution of the fourth operation flow, the light-emission intensity of the light source 21 (the pulse amplitude of the irradiation light), the light emitting period of the light source 21 on a pulse-by-pulse basis (the pulse width of the irradiation light), and the number of times the light source 21 has emitted light on a frame-by-frame basis (the number of pulses of irradiation light) are initialized.

In the fourth operation flow as depicted in FIG. 31, steps V1, V2, V3, and V4 are equivalent to the steps S1, S2, S4, and S5 in FIG. 20A, respectively. For this reason, the steps unique to the fourth operation flow are described below.

In the step V5, the S/N ratio is calculated and obtained from the Apulse and DC that are obtained in the light-emitting frame and the non-emitting frame, respectively.

In a next step V6, whether the S/N ratio is greater than a predetermined threshold stored in the storage unit is determined. When the result of determination is positive in the step V6, the processing shifts to a step V7, and when the result of determination is negative, the processing shifts to a step V8.

In the step V7, the distance value d, which is the result of TOF computation, is output in a format adapted to the output format. Once the step V7 is performed, the processing shifts to a step V9.

In a step V9, the light-emission intensity of the light source 21 is reduced. This is because, for example, when the intensity of the environmental light incident on the image sensor 29 (for example, the sunlight and illumination light) is high, there is some concern that the amount of signal (i.e., the amounts of electric charge) may be saturated in the charge storage unit. Note also that in view of the accuracy of distance measurement, it is desired that the light-emission intensity be lowered, at least, to meet the condition (YES) in the step V6. Once the step V9 is performed, the processing shifts to a step V10.

In the step V10, whether or not to terminate the measurement is determined. When the result of determination is positive in the step V10, the flow is terminated. By contrast, when the result of determination is negative in the step V10, the processing returns to the step V1, and phase signals are obtained in the next frame.

In the step V8, whether or not the number of times the light source 21 has emitted light on a frame-by-frame basis is less than the capacity of signal on a pixel-by-pixel basis (prescribed upper limit), which is determined by the light-emission intensity of the light source 21, the light emitting period of the light source 21 on a pulse-by-pulse basis, the level of the light-receptive sensitivity of the light receiver, and the storage capacity of the charge storage unit. When the result of determination is positive in the step V8, the processing shifts to the step V11, and when the result of determination is negative, the processing shifts to the step V12.

In the step V11, the light-emission intensity is increased to improve the S/N ratio in the next frame. In so doing, it is desired that the light-emission intensity be increased, at least, to meet the condition (YES) in the step V6. Once the step V11 is performed, the processing shifts to the step V10.

In the step V12, the main controller 80 is notified of error data. Once the step V12 is performed, the flow is terminated. The main controller 80 changes, based on the received error data, the initial values set to the light-emission intensity of the light source 21, the light emitting period of the light source 21, and the number of times the light source 21 is to emit light on a frame-by-frame basis, so as to satisfy the conditions in the step V6 or the step V8 (so as to achieve "YES"), and then gives instructions to resume the fourth operation flow.

Note also that when the distance sensor 20 is used in environments where the intensity of environmental light is small and the saturation of the amount of electric charge is hardly expected in the charge storage unit, for example, when the distance sensor 20 is mainly used in indoor environments, the step V9 in FIG. 31 may be omitted.

Figure 32:
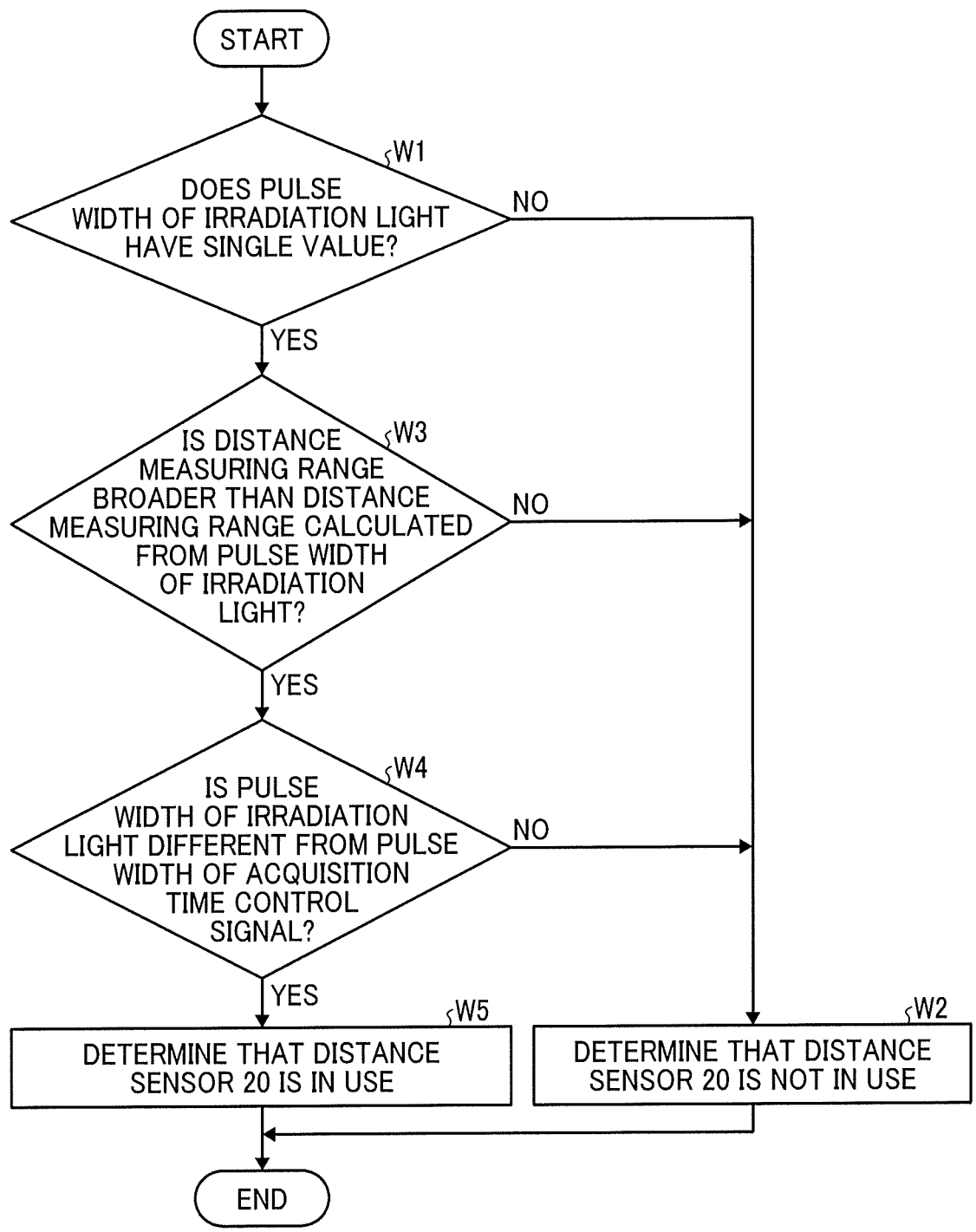
FIG. 32 is a flowchart of how whether or not a distance sensor is being used is determined, according to an embodiment of the present disclosure.

FIG. 32 is a flowchart of how whether or not the distance sensor 20 according to the present embodiment is being used is determined.

In a first step W1, whether or not the pulse width of the irradiation light has a single value is determined in a target TOF sensor. This is because the illumination light is to have a single pulse width in the distance sensor 20. When the result of determination is negative in the step W1, the processing shifts to a step W2, and when the result of determination is positive, the processing shifts to a step W3.

In a step W2, it is determined that the distance sensor 20 is not in use. Once this determination is made, the flow is terminated.

In a step W3, whether or not the distance measuring range is broader than a distance measuring range calculated from the pulse width of the irradiation light is determined. This is because in the distance sensor 20 according to the present embodiment, the distance measurable range is broader than the theoretical distance measurable range, which is determined by the pulse width of the irradiation light, due to anti-aliasing. When the result of determination is negative in the step W3, the processing shifts to the step W2, and when the result of determination is positive, the processing shifts to a step W4.

In a step W4, whether the pulse width of the irradiation light is different from the pulse width of the acquisition time control signal is determined. In the known TOF sensors, the pulse width Tp of the irradiation light is equal to the pulse width Tv of the acquisition time control signal. However, in the distance sensor 20 according to the present embodiment, the pulse width of the irradiation light becomes shorter than the pulse width of the acquisition time control signal in accordance with desired magnification of the distance measurable range. This is because the above determination is performed. When the result of determination is negative in the step W4, the processing shifts to the step W2, and when the result of determination is positive, the processing shifts to a step W5.

In a step W5, it is determined that the distance sensor 20 is in use. Once this determination is made, the flow is terminated. Whether or not the distance sensor 20 is being used can be determined in the processes as described above.

From a first point of view, as described above, the distance sensor 20 according to the present embodiment (the distance sensors 20A to 20H according to the first to eighth examples, respectively) is a distance-measuring apparatus that includes the light source 21, the image sensor 29 (imaging element) that receives and photoelectrically converts the light that is emitted from the light source 21 and reflected by an object, and sequentially obtains the electrical signals upon being sorted into a plurality of phase signals, and the TOF computing unit (computing unit) that calculates the distance to the object based on the multiple phase signals, and the period of time during which the image sensor 29 obtains the phase signals is set to be longer than the light emitting period of the light source 21.

In this configuration, the period of time during which the image sensor 29 obtains the phase signals is set to be longer than the light emitting period of the light source 21. For this reason, even if the light source 21 has a single light emitting period, the distance measurable range can be made broader than the distance measurable range of the known distance-measuring apparatuses, which is determined by the light emitting period of the light source. As a result, the distance measurable range can be broadened while preventing complication in configuration or control.

The distance sensor 20 further includes a controller that controls the light source 21 and the image sensor 29, and it is desired that the controller can adjust the pulse width of the acquisition time control signal, which is used to control the period of time during which phase signals are obtained, with reference to the pulse width of a light-source driving signal, which is used to drive the light source 21. Note also that the light emitting period of the light source 21 is determined by the pulse width of the light-source driving signal.

In this configuration, for example, the distance measurable range in a later frame (e.g., the next frame) can be adjusted according to the result of computation by the TOF computing unit. thus aliasing in a later frame can be prevented from occurring.

From a second point of view, the distance sensor 20 according to the present embodiment (the distance sensors 20A to 20H according to the first to eighth examples, respectively) is a distance-measuring apparatus that includes the light source 21, the image sensor 29 (imaging element) that receives and photoelectrically converts the light that is emitted from the light source 21 and reflected by an object, and sequentially obtains the electrical signals upon being sorted into a plurality of phase signals, the controller that controls the light source 21 and the image sensor 29, and the TOF computing unit (computing unit) that calculates the distance to the object based on the multiple phase signals, and the controller can adjust the pulse width of the acquisition time control signal, which is used to control the period of time during which the image sensor 29 obtains phase signals, with reference to the pulse width of a light-source driving signal, which is used to drive the light source 21.

In this configuration, for example, the pulse width of the acquisition time control signal may be made wider than the pulse width of a light-source driving signal. By so doing, even if a light-source driving signal has a single pulse width, the distance measurable range can be made broader than the distance measurable range of the known distance-measuring apparatuses, which is determined by the pulse width of a light-source driving signal. As a result, the distance measurable range can be broadened while preventing complication in configuration or control.

Moreover, in the distance sensor 20 from the second point of view, for example, the distance measurable range in a later frame (e.g., the next frame) can be adjusted according to the result of computation by the TOF computing unit, and thus aliasing in a later frame can be prevented from occurring.

Further, in the distance sensor 20 from the second point of view, it is desired that the controller control the pulse width of the acquisition time control signal so as to be wider than the pulse width of a light-source driving signal.

In such a configuration, the distance measurable range can be made broader than the distance measurable range of the known distance-measuring apparatuses, which is determined by the pulse width of a light-source driving signal.

In the distance sensor 20, even if the pulse width of a light-source driving signal is set to equal to or shorter than that of the known distance-measuring apparatuses, the distance measurable range can be made broader than the distance measurable range of the known distance-measuring apparatuses. In other words, with the distance sensor 20, the accuracy of distance measurement can be maintained or enhanced and the distance measurable range can be broadened.

It is desired that the distance sensor 20 further include an aliasing determining unit configured to determine whether or not aliasing is present based on the pulse width of a light-source driving signal, the acquisition time control signal, and the result of computation by the TOF computing unit.

When the aliasing determining unit determines that aliasing is present in one frame, it is desired that the controller control the pulse width of the acquisition time control signal in a frame temporally later than the one frame (e.g., the next frame) so as to be wider than the pulse width of the acquisition time control signal in the one frame.

When the aliasing determining unit determines that no aliasing is present in one frame, it is not necessary for the controller to change the pulse width of the acquisition time control signal in a frame temporally later than the one frame (e.g., the next frame) with reference to the pulse width of the acquisition time control signal in the one frame.

When the aliasing determining unit determines that no aliasing is present in one frame, the controller may change at least one of the pulse width of the light-source driving signal and the pulse width of the acquisition time control signal in a frame temporally later than the one frame (e.g., the next frame) with reference to the pulse width of the light-source driving signal or the pulse width of the acquisition time control signal in the one frame. In other words, on condition that no aliasing occurs, for example, the pulse width of the light-source driving signal may be shortened in order to improve the accuracy of distance measurement, or the pulse width of the acquisition time control signal may be shortened in order to enhance the speed of the computation.

The image sensor 29 may include a plurality of light receivers, and the controller may adjust at least one of the pulse width of the light-source driving signal and the pulse width of the acquisition time control signal, such that the aliasing determining unit determines that no aliasing is present with respect to the maximum value in the result of computation performed on each one of the light receivers by the computing unit. In other words, at least one of the pulse width of the light-source driving signal and the pulse width of the acquisition time control signal may be adjusted, such that the distance measurable range in the next frame will exceed the maximum value as above. In such a configuration, the changes over time in the condition of the measurable area can be handled.

The distance sensor 20 may further include the phase signal determining unit that compares amounts of signal of the multiple phase signals with each other and determines the phase signal with a greatest amount of signal among the multiple phase signals, and the computing unit may calculate the distance based on a result of determination made by the phase signal determining unit.

The distance sensor 20 may further include the phase signal determining unit that compares amounts of signal of the multiple phase signals with each other and determines the order of size among the amounts of signal of the multiple phase signals, and the computing unit may calculate the distance based on a result of determination made by the phase signal determining unit.

It is desired that the operation of the phase signal determining unit and the operation of the computation unit be performed in parallel. In such a configuration, the changes over time in the condition of the measurable area can be handled.

It is desired that the computation unit calculates the distance using the phase signals from which an offset component, i.e., the output from the image sensor 29 when the light source 21 is not emitting light, is subtracted.

Moreover, it is desired that the controller adjust the light-emission intensity of the light source 21 based on the ratio of the phase signals to an offset component, i.e., the output from the image sensor 29 when the light source 21 is not emitting light. In such a configuration, it is more desirable that the controller control the light-emission intensity of the light source 21 based on the number of times the light source 21 is to emit light on a frame-by-frame basis.

It is desired that the pulse cycle of a light-source driving signal be equal to the pulse cycle of an acquisition time control signal.

With a mobile object provided with the distance sensor 20, a mobile object with outstanding position controllability (for example, safety in collision avoidance) can be provided.

A method of measuring distance according to the present embodiment includes a step of controlling the light source 21 to emit pulses of light, a step of receiving and photoelectrically converting the light, which is emitted from the light source 21 and then reflected by an object, into multiple electrical signals, to obtain the multiple electrical signals upon being sorted into multiple phase signals, a step of calculating distance to the object based on the multiple phase signals, a step of determining whether or not aliasing is present based on the light emitting period of the light source 21 on a pulse-by-pulse basis (the pulse width of a light-source driving signal), the period of time during which phase signals are obtained (the pulse width of the acquisition time control signal), and a result of the step of calculating, and a step of adjusting, when it is determined in the step of determining that aliasing is present, the period of time during which phase signals are obtained with reference to the light emitting period of the light source 21 on a pulse-by-pulse basis.

In this configuration, for example, when it is determined in the step of determining that aliasing is present, the pulse width of the acquisition time control signal may be increased in the step of adjusting. By so doing, the distance measurable range can be broadened in a frame at a later time, and aliasing can be prevented from occurring.

In the method of measuring distance according to the present embodiment, even if the pulse width of a light-source driving signal is set to equal to or shorter than that of the known distance-measuring method, the distance measurable range can be made broader than the distance measurable range of the known distance-measuring methods. In other words, with the distance-measuring method according to the present embodiment, the accuracy of distance measurement can be maintained or enhanced and the distance measurable range can be broadened.

Figure 33:
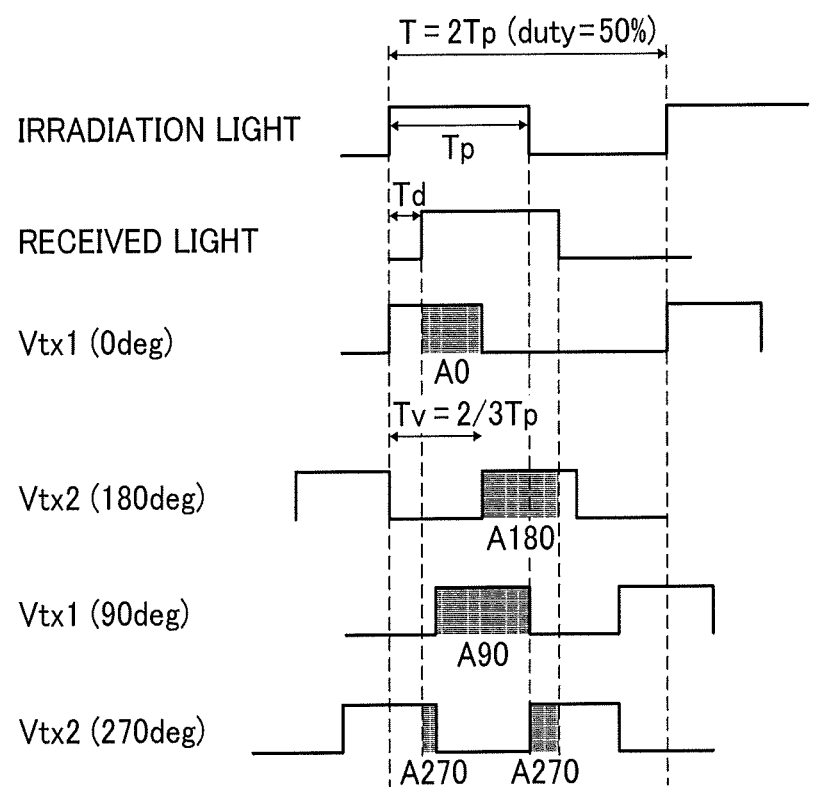
FIG. 33 is a diagram illustrating a modification in which the pulse width of an acquisition time control signal is made shorter than the pulse width of a light-source driving signal.

FIG. 33 is a diagram illustrating a modification in which the pulse width of the acquisition time control signal is made shorter than the pulse width of a light-source driving signal.

In the embodiment described above, the pulse width Tv of the acquisition time control signal is made equal to or wider than the pulse width of a light-source driving signal. However, for example, as in the modification illustrated in FIG. 33, Tv may be made shorter than Tp. In such a configuration, the following equation is established with reference to the delay time Td and Tv.

$$Td = Tv \times (A180/A90 - \tfrac{1}{2})$$

In this equation, "Tv" denotes a proportionality constant used in the computation related to variations in value of distance measurement (distance value). Note also that "Tp" is used in the known four-phase TOF sensors. Accordingly, in the modification as illustrated in FIG. 33, the distance measurable range becomes narrower than that of the known four-phase TOF sensors, but the variations in value of distance measurement becomes small (the accuracy of distance measurement improves). In view of the above circumstances, the modification as illustrated in FIG. 33 is beneficial in improving the accuracy of distance measurement when the distance measurable range can afford reduction. For example, Tv may be set to equal to or greater than Tp in advance, and when the aliasing determining unit determines that no aliasing is present based on the distance measurable range R' and the value of distance measurement, Tv may be made shorter than Tp such that the distance measurable range R' does not fall below the value of distance measurement. By so doing, aliasing can be prevented from occurring and the accuracy of distance measurement can be improved.

On the contrary, Tv may be set shorter than Tp in advance, and when the aliasing determining unit determines that aliasing is present based on the distance measurable range R' and the value of distance measurement, Tv may be made longer than Tp such that the distance measurable range R' exceeds the value of distance measurement to some extent. By so doing, the accuracy of distance measurement can be prevented from decreasing and aliasing can be prevented from occurring.

In the embodiment described above, the phototransmitter system is a non-scanning phototransmitter system. However, the phototransmitter system may be a scanning phototransmitter system such as a light deflector (for example, a polygon mirror, a galvano mirror, and a micro-electromechanical systems (MEMS) mirror). In this configuration, for example, a plurality of light rays that are emitted from a plurality of light emitters, respectively, that are arranged in one direction (line light source) may be scanned in a direction not parallel to the one direction in which the light emitters are arranged (for example, a direction orthogonal to the one direction in which the light emitters are arranged), and be received by a plurality of light receivers (line image sensor) that are arranged in parallel with the one direction in which the light emitters are arranged. By so doing, a distance image is generated. Alternatively, the light that is emitted from a single light emitter may be two-dimensionally scanned by a light deflector, and the light that is reflected from an object may be received by an area image sensor.

In the embodiments described above, cases in which the distance sensor 20 that serves as an example of the distance-measuring equipment according to the embodiments of the present disclosure is used for the vehicle 1 are described. However, no limitation is intended thereby. For example, the distance sensor 20 may be used, for example, for a mobile object (for example, a car, a ship, and an aircraft) other than the vehicle 1, a surveillance camera, a three-dimensional measuring device that measures the three-dimensional shape of an object, and a robot that autonomously moves while the distance sensor 20 is checking its own current position.

With a surveillance camera provided with the distance sensor 20, high-quality monitor images of an object to be monitored can be obtained.

With a three-dimensional measuring device provided with the distance sensor 20, the three-dimensional data of the object to be measured can precisely be obtained.

With a robot provided with the distance sensor 20, appropriate autonomous movement (such as approaching operation, moving-away operation, and translation operation) is achieved for objects around.

In the embodiment described above, cases in which pulses of light are emitted from a single light-emitting diode (LED) (light emitter) and the light that is reflected from an object is received by an area image sensor are described. However, no limitation is intended thereby.

For example, pulses of light are sequentially emitted from a plurality of two-dimensionally arranged light emitters, and the pulses of light that are emitted from the multiple light emitters and reflected by an object may be sequentially received by a single light receiver to generate a distance image.

For example, pulses of light may be simultaneously emitted from a plurality of two-dimensionally arranged light emitters, and a plurality of pulses of light that are emitted from the multiple light emitters and then reflected by an object may be simultaneously received by a plurality of light receivers, respectively, that are two-dimensionally arranged. By so doing, a distance image is generated.

For example, when simply the distance to a certain object is to be measured and the acquisition of a three-dimensional data (distance image) of the object is not desired, only a single light emitter and a single light receiver may be provided for the phototransmitter system and the photoreceptor system, respectively.

In the embodiments described above, the position controller 40 may perform some of the processes of the control system 203, and the control system 203 may perform some of the processes of the position controller 40.

In the embodiments described above, cases in which the traveling control device 10 includes a single distance sensor 20 are described. However, no limitation is indicated thereby. For example, the traveling control device 10 may include a plurality of distance sensors 20 according to, for example, the size of a vehicle and the measurable area.

The embodiments described above relate to cases in which the distance sensor 20 is used for the traveling control device 10 that monitors an area in the directions of travel of a vehicle. However, no limitation is indicated thereby. For example, the distance sensor 20 may be provided for an apparatus that monitors the rear view or side view of the vehicle.

In view of the above circumstances, the distance-measuring equipment and the distance-measuring method according to the embodiments of the present disclosure may be widely applied to all aspects of distance measuring technologies where time-of-flight (TOF) is adopted.

In other words, the distance-measuring equipment and the distance-measuring method according to the embodiments of the present disclosure may be applied to acquisition of two-dimensional data of an object or detection of the presence or absence of an object.

Further, the concrete numerical values, shapes, or the like, which are used in the embodiments described above, are just examples and may be modified as appropriate without departing from the spirit or scope of the present disclosure.

In order to broaden the distance measurable range while preventing complication in configuration or control, the above embodiments of the present disclosure are conceived.

In the embodiments of the present disclosure as above, in particular, anti-aliasing can be achieved without using a plurality of modulation frequencies for the irradiation light.

In the embodiment as described above, the distance measurable range can be broadened without complicating the frame configuration.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

What is claimed is:

1. A distance-measuring apparatus, comprising:
a light source to emit light;
an imaging sensor to receive and photoelectrically convert the light, which is emitted from the light source and then reflected by an object, into a plurality of electrical signals, and to obtain the plurality of electrical signals upon being sorted into a plurality of phase signals;
a computing circuit to calculate distance to the object based on the plurality of phase signals; and
a control circuit to control the light source and the imaging sensor, wherein
a period of time during which the imaging sensor obtains the plurality of phase signals is different from a light emitting period of the light source in length,
the control circuit adjusts a first pulse width of a control signal used to control the period of time during which the imaging sensor obtains the plurality of phase signals with reference to a second pulse width of a driving signal used to drive the light source, and
the light emitting period of the light source is determined by the second pulse width of the driving signal.

2. The distance-measuring apparatus according to claim 1, wherein the period of time during which the imaging sensor obtains the plurality of phase signals is set to be longer than the light emitting period of the light source.

3. The distance-measuring apparatus according to claim 1, wherein the control circuit adjusts light-emission intensity of the light source based on a ratio of the plurality of phase signals to an offset component that is an output from the imaging sensor when the light source is not emitting light.

4. The distance-measuring apparatus according to claim 1, further comprising an aliasing determining circuit to determine whether or not aliasing is present based on the second pulse width of the driving signal, the first pulse width of the control signal, and a result of computation by the computing circuit.

5. The distance-measuring apparatus according to claim 4, wherein when the aliasing determining circuit determines that aliasing is present in one frame, the control circuit controls the first pulse width of the control signal in a frame temporally later than the one frame so as to be wider than the first pulse width of the control signal in the one frame.

6. The distance-measuring apparatus according to claim 4, wherein when the aliasing determining circuit determines that no aliasing is present in one frame, the control circuit does not change the first pulse width of the control signal in a frame temporally later than the one frame with reference to the first pulse width of the control signal in the one frame.

7. The distance-measuring apparatus according to claim 4, wherein when the aliasing determining circuit determines that no aliasing is present in one frame, the control circuit changes at least one of the second pulse width of the driving signal and the first pulse width of the control signal in a frame temporally later than the one frame with reference to the second pulse width of the driving signal or the first pulse width of the control signal in the one frame.

8. The distance-measuring apparatus according to claim 4, wherein
the imaging sensor includes a plurality of light receivers, and
the control circuit adjusts at least one of the second pulse width of the driving signal and the first pulse width of the control signal such that the aliasing determining circuit determines that no aliasing is present with respect to a maximum value in a result of computation performed on each one of the plurality of light receivers by the computing circuit.

9. The distance-measuring apparatus according to claim 1, wherein the computing circuit computes the distance using the plurality of phase signals from which an offset component that is an output from the imaging sensor when the light source is not emitting light is subtracted.

10. The distance-measuring apparatus according to claim 1, further comprising a phase signal determining circuit to compare amounts of signal of the plurality of phase signals with each other and determine the phase signal with a greatest amount of signal among the plurality of phase signals,
wherein the computing circuit computes the distance based on a result of determination made by the phase signal determining circuit.

11. The distance-measuring apparatus according to claim 10, wherein operation of the phase signal determining circuit and operation of the computation unit are performed in parallel.

12. The distance-measuring apparatus according to claim 1, further comprising a phase signal determining circuit to compare amounts of signal of the plurality of phase signals with each other to determine an order of size among the amounts of signal of the plurality of phase signals,
wherein the computing circuit computes the distance based on a result of determination made by the phase signal determining circuit.

13. A mobile object, comprising:
the distance-measuring apparatus according to claim 1.

14. A robot, comprising:
the distance-measuring apparatus according to claim 1.

15. A three-dimensional measuring device, comprising:
the distance-measuring apparatus according to claim 1.

16. A surveillance camera, comprising:
the distance-measuring apparatus according to claim 1.

17. A distance-measuring apparatus comprising:
a light source to emit light;
an imaging sensor to receive and photoelectrically convert the light, which is emitted from the light source and then reflected by an object, into a plurality of electrical signals, and to obtain the plurality of electrical signals upon being sorted into a plurality of phase signals;
a control circuit to control the light source and the imaging sensor; and
a computing circuit to calculate distance to the object based on the plurality of phase signals, wherein
the control circuit adjusts a first pulse width of a control signal used to control a period of time during which the imaging sensor obtains the plurality of phase signals with reference to a second pulse width of a driving signal used to drive the light source, and
the control circuit controls the first pulse width of the control signal so as to be wider than the second pulse width of the driving signal.

18. A method of measuring distance, the method comprising:
controlling a light source to emit light;
receiving and photoelectrically converting the light, which is emitted from the light source and then reflected by an object, into a plurality of electrical signals, to obtain the plurality of electrical signals upon being sorted into a plurality of phase signals;
calculating distance to the object based on the plurality of phase signals;
determining whether or not aliasing is present based on a light emitting period of the light source, a period of time during which the plurality of phase signals are obtained, and a result of the calculating;
adjusting the period of time during which the plurality of phase signals are obtained, with reference to a light emitting period, according to a result of the determining;
adjusting a first pulse width of a control signal used to control the period of time, during which the plurality of phase signals are obtained, with reference to a second pulse width of a driving signal used to drive the light source, and
the light emitting period of the light source is determined by the second pulse width of the driving signal.

* * * * *